United States Patent
Suzuki et al.

(10) Patent No.: US 10,740,040 B2
(45) Date of Patent: Aug. 11, 2020

(54) SYSTEM AND COMPUTER FOR CONTROLLING CACHING FOR LOGICAL STORAGE

(71) Applicant: Hitachi, Ltd., Tokyo (JP)

(72) Inventors: Takanobu Suzuki, Tokyo (JP); Masakuni Agetsuma, Tokyo (JP); Hiroaki Akutsu, Tokyo (JP); Sachie Tajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/772,098

(22) PCT Filed: Jan. 22, 2016

(86) PCT No.: PCT/JP2016/051788
§ 371 (c)(1),
(2) Date: Apr. 30, 2018

(87) PCT Pub. No.: WO2017/126097
PCT Pub. Date: Jul. 27, 2017

(65) Prior Publication Data
US 2018/0314466 A1    Nov. 1, 2018

(51) Int. Cl.
*G06F 12/08* (2016.01)
*G06F 3/06* (2006.01)
(Continued)

(52) U.S. Cl.
CPC ............ *G06F 3/0665* (2013.01); *G06F 3/061* (2013.01); *G06F 3/0604* (2013.01); *G06F 3/067* (2013.01);
(Continued)

(58) Field of Classification Search
CPC ...... G06F 3/0604; G06F 3/061; G06F 3/0631; G06F 3/0656; G06F 3/067; G06F 3/0689; G06F 12/0871; G06F 12/0866
(Continued)

(56) References Cited

U.S. PATENT DOCUMENTS

| 7,620,670 B2 | 11/2009 | Tokuda et al. |
| 2011/0167203 A1* | 7/2011 | Yoshida ............... G06F 12/0804 711/103 |

(Continued)

FOREIGN PATENT DOCUMENTS

JP    4480479 B2    6/2010

OTHER PUBLICATIONS

International Search Report of PCT/JP2016/051788 dated Apr. 12, 2016.

*Primary Examiner* — Than Nguyen
(74) *Attorney, Agent, or Firm* — Mattingly & Malur, PC

(57) ABSTRACT

The computer system executes a storage program that operates on an OS to provide a logical volume to a host. The computer system includes volume management information including information on a storage function to be applied to the logical volume provided by the storage program. Upon receiving an I/O request for the logical volume from the host, the OS determines whether it is necessary for the storage program to perform an I/O process on the basis of the information on the storage function to be applied to the logical volume by referring to the volume management information. When it is determined that the I/O process is necessary, the OS communicates with the storage program and the storage program executes the I/O process. When it is determined that it is not necessary for the storage program to perform the I/O process, the OS outputs an I/O response to the host.

20 Claims, 17 Drawing Sheets

(51) Int. Cl.
*G06F 13/10* (2006.01)
*G06F 12/0866* (2016.01)
*G06F 12/0871* (2016.01)

(52) U.S. Cl.
CPC .......... *G06F 3/0614* (2013.01); *G06F 3/0631* (2013.01); *G06F 3/0656* (2013.01); *G06F 3/0659* (2013.01); *G06F 3/0689* (2013.01); *G06F 12/0866* (2013.01); *G06F 13/10* (2013.01); *G06F 12/0871* (2013.01); *G06F 2212/261* (2013.01)

(58) Field of Classification Search
USPC ........................................................ 711/113
See application file for complete search history.

(56) References Cited

U.S. PATENT DOCUMENTS

| | | | |
|---|---|---|---|
| 2012/0303863 A1* | 11/2012 | Benhase | G06F 12/0866 711/103 |
| 2015/0006813 A1* | 1/2015 | Goyal | G06F 12/0866 711/113 |
| 2015/0193144 A1* | 7/2015 | Bilas | G06F 3/064 711/103 |
| 2018/0032433 A1* | 2/2018 | Ito | G06F 13/10 |

\* cited by examiner

Initiator-Target queue (ITQ)  410

| | I/O request | | I/O request | |
|---|---|---|---|---|
| 1110 | Volume number | 2 | Volume Number | 1 |
| 1120 | I/O type | Write | I/O type | Read |
| 1130 | Volume address | 0x300 | Volume address | 0x100 |
| 1140 | Data size | 0x400 | Data size | 0x100 |
| 1150 | Memory address | 0x58000 | | |

FIG. 6

Target-Initiator queue (TIQ)  420

| | I/O response | | I/O response | |
|---|---|---|---|---|
| 1210 | Volume number | 2 | Volume number | 1 |
| 1215 | I/O type | Write | I/O type | Read |
| 1220 | Volume address | 0x300 | Volume address | 0x100 |
| 1225 | Data size | 0x400 | Data size | 0x100 |
| 1230 | | | Memory address | 0x58000 |

| 1010 | 1020 | 1030 | 1035 | 1040 | 1050 | 1060 |
|---|---|---|---|---|---|---|
| Volume number | Volume state | Volume size | Volume address | Disk device number | Disk device address | Storage function |
| 1 | I/O enabled | 1TB | 0x000 | 1 | 0x2000 | RAID Snapshot |
|   |   |   | 0x100 | 3 | 0x4000 |   |
| 2 | I/O disabled | 200GB | 0x000 | 2 | 0x2000 | Yes |
|   |   |   | 0x100 | 3 | 0x2000 |   |

| 910 | 920 | 930 | 940 | 950 |
|---|---|---|---|---|
| Volume number | Volume address | Data size | Memory address | Data status |
| 1 | 0x100 | 0x400 | 0x0000 | Clean |
| 2 | 0x400 | 0x200 | 0x0800 | Dirty and Writing |
| 1 | 0x600 | 0x100 | 0x0B00 | Clean and Reading |
| 1 | 0x800 | 0x400 | 0x0F00 | Dirty and Writing |
| 1 | 0x900 | 0x300 | 0x5000 | Dirty |
| - | - | 0x5E00 | 0x50000 | Vacant |

FIG. 9

1300
        ⌐ 1310                          ⌐ 1320
       ┌──────────────────────────┬──────────────────┐
       │ Process ID of storage program │  Queue pair ID  │
       ├──────────────────────────┼──────────────────┤
1330 ⌁ │           2000           │       1, 2       │
       ├──────────────────────────┼──────────────────┤
1340 ⌁ │           2020           │        2         │
       └──────────────────────────┴──────────────────┘

FIG. 10

1400
         ⌐ 1410              ⌐ 1420
       ┌──────────────┬──────────────────┐
       │ Resource type │  Resource volume │
       ├──────────────┼──────────────────┤
1430 ⌁ │   FC port    │        8         │
       ├──────────────┼──────────────────┤
1440 ⌁ │ Ethernet port │        8         │
       ├──────────────┼──────────────────┤
1450 ⌁ │    Cache     │      100GB       │
       └──────────────┴──────────────────┘

| Queue pair ID | TIQ storage starting address | ITQ storage starting address | Queue size | Manipulat-ability |
|---|---|---|---|---|
| 1 | 0x800000 | 0x880000 | 0x80000 | Disabled |
| 2 | 0x900000 | 0x980000 | 0x80000 | Enabled |
| 3 | 0xA00000 | 0xA80000 | 0x80000 | Enabled |
| 4 | 0xB00000 | 0xB80000 | 0x80000 | Enabled |

| Volume item | Upper limit | Lower limit |
|---|---|---|
| Number of queue pairs processed by storage program | 8 | 1 |
| Number of FC ports | 8 | - |
| Number of Ethernet ports | 8 | - |
| Memory volume used by queue pairs | 256MB | - |

FIG. 13

SYSTEM AND COMPUTER FOR CONTROLLING CACHING FOR LOGICAL STORAGE

TECHNICAL FIELD

The present invention relates to a computer system and a computer.

BACKGROUND ART

Japanese Patent No. 4480479 (PTL 1) is an example of a literature that discloses a related art of the present technical field. This literature discloses a technique of operating a storage system (file system) as a part of an operating system (Operating System: OS).

CITATION LIST

Patent Literature

[PTL 1]
Japanese Patent No. 4480479

SUMMARY OF INVENTION

Technical Problem

In order to improve portability of a storage program and enhance development efficiency thereof, there is a new demand to implement the storage program as a program operating on an OS rather than as a program inside the OS. In this case, it is requested that large-volume and various storage processes are to be executed at a high speed and with high reliability.

However, when a storage program is operated on an OS, the traffic between the OS and the storage program, for example, increases and there is a possibility that I/O performance may decrease if an I/O bandwidth is not sufficient. In this respect, PTL 1 does not consider a technique in which a storage program is operated on an OS and does not discuss a technique for suppressing a decrease in I/O performance.

Therefore, the present invention provides a technique for maintaining I/O performance while operating a storage program on an OS.

Solution to Problem

In order to solve the problem, a computer system according to an aspect of the present invention includes a processor that executes an operating system and a storage program that operates on the operating system to provide a logical volume to a host. The computer system further includes a memory that includes a queue for retaining communication data between the operating system and the storage program, and volume management information including information on a storage function to be applied to the logical volume provided by the storage program. Upon receiving an I/O request for the logical volume from the host, the operating system determines whether it is necessary for the storage program to process the I/O request on the basis of the information on the storage function to be applied to the logical volume which is a target of the I/O request, by referring to the volume management information, and communicates with the storage program via the queue when it is determined that the process is necessary. The storage program executes a process based on the I/O request. The operating system outputs a response to the I/O request to the host when it is determined that it is not necessary for the storage program to process the I/O request.

Advantageous Effects of Invention

According to the present invention, it is possible to provide a technique for enabling I/O performance to be maintained while operating a storage program on an OS. Other objects, configuration, and advantageous effects other than those described above will be understood from the description of the embodiment of the invention.

BRIEF DESCRIPTION OF DRAWINGS

FIG. 6 is a diagram illustrating a configuration example of an Initiator-Target queue 410.
FIG. 7 is a diagram illustrating a configuration example of a Target-Initiator queue 420.
FIG. 8 is a diagram illustrating a configuration example of a volume management table 1000.
FIG. 9 is a diagram illustrating a configuration example of a cache management table 900.
FIG. 10 is a diagram illustrating a configuration example of a process management table 1300.
FIG. 11 is a diagram illustrating a configuration example of a resource management table 1400.
FIG. 12 is a diagram illustrating a configuration example of a queue pair management table 1500.
FIG. 13 is a diagram illustrating a configuration example of a policy management table 1600.

DESCRIPTION OF EMBODIMENTS

Hereinafter, an embodiment of the present invention will be described with reference to the drawings. For the sake of clear explanation, omissions and simplifications will be made appropriately in the following descriptions and drawings. The present invention is not limited to this embodiment, and all application examples that coincide with the spirit of the present invention fall within the technical scope of the present invention. The respective components may be provided plurally or solely unless particularly stated otherwise.

In the following description, although various items of information are sometimes described using an expression of an "xxx table", the respective items of information may be expressed by any data structure. That is, the "xxx table" can be referred to as "xxx information" to show that the respective items of information do not depend on the data structure.

A management system can be configured by one or a plurality of computers. For example, when a management computer processes and displays information, the management computer is a management system. For example, when a function equivalent to the management computer is implemented by a plurality of computers, the plurality of computers (which may include a display computer when the display computer performs a display operation) is the management system. In the present embodiment, a management terminal 240 is the management system.

In the following description, there may be cases where processing is described using a "program" or a process thereof as the subject. However, since the determined processing is performed using a storage resource (for example, a memory) and/or a communication interface device (for example, a communication port) appropriately when the program is executed by a processor (for example, a CPU (Central Processing Unit)), the processor may be also used as the subject of the processing. The processor operates as functional units that implement predetermined functions by operating according to the program. A device and a system that includes the processor are a device and a system that includes these functional units.

Processing described using a program, a process, or a processor as the subject may be described using a computer (for example, a server, a storage system, a management computer, a client, or a host) as the subject. A processor may include a hardware circuit that performs a part or all of the processes performed by the processor. A computer program may be installed from a program source in respective computers. The program source may be a program distribution server (for example, a management computer) or a storage medium, for example.

Figure 1:
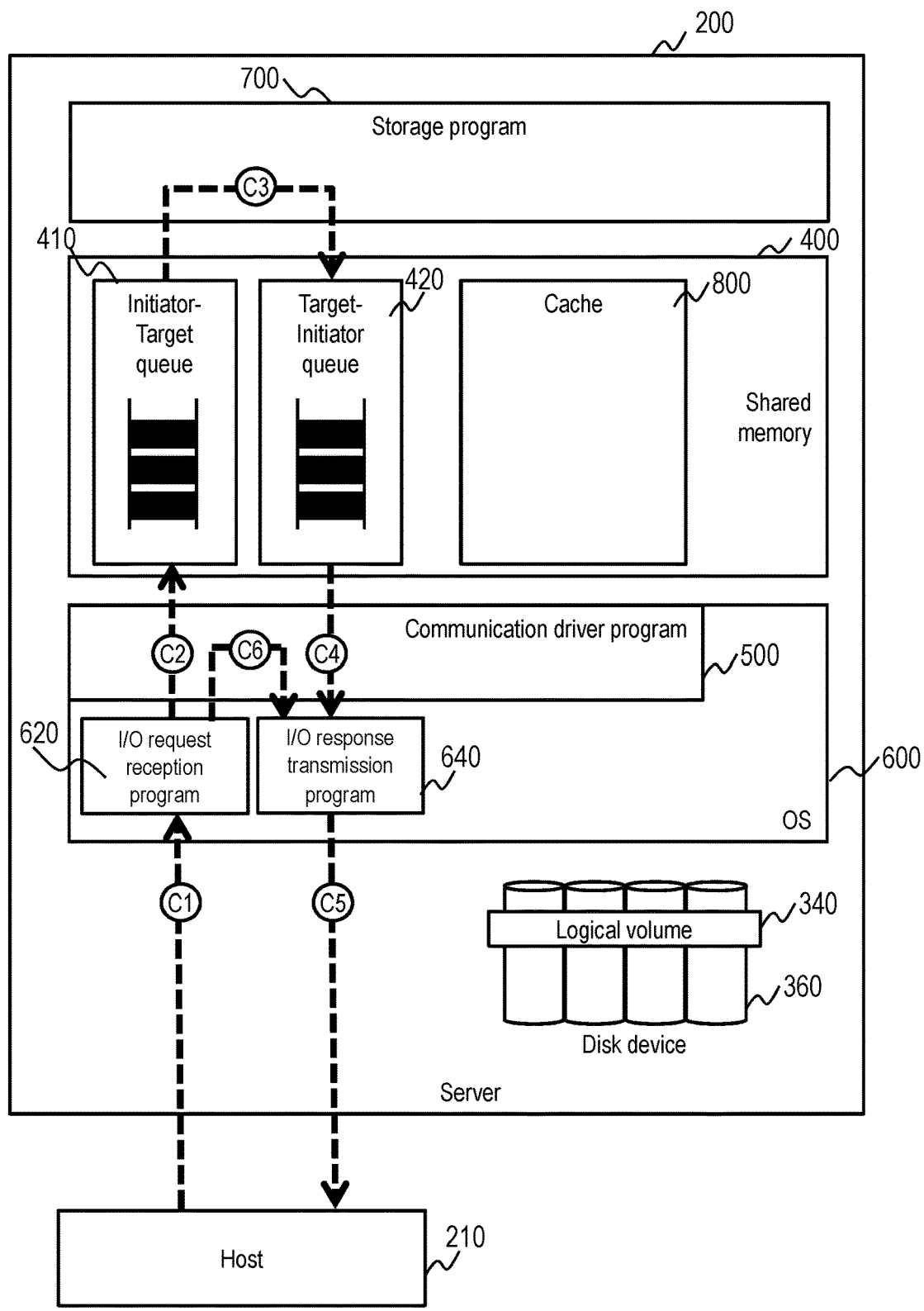
FIG. 1 is a schematic diagram illustrating an outline of an I/O process.

FIG. 1 is a schematic diagram illustrating an outline of an I/O process. A computer system 10 includes a server 200 and a host 210. The server 200 includes a shared memory 400 and a disk device 360. An OS 600 operates on the server 200 and a storage program 700 operates on the OS 600. The OS 600 includes an I/O request reception program 620, an I/O response transmission program 640, and a communication driver program 500.

A storage program 700 configures one or two or more virtual disk devices from physical storage areas of a plurality of disk devices 360 and provides the virtual disk device to a host 210. In the following description, this virtual disk device will be referred to as a logical volume 340. RAID (Redundant Arrays of Inexpensive Disks) is an example of a method for configuring the logical volume 340. By using a plurality of disk devices 360, improvement in reliability based on data redundancy and improvement in performance based on a parallel operation of the disk devices 360 can be expected.

The shared memory 400 includes a pair of an Initiator-Target queue (ITQ) 410 and a Target-Initiator queue (TIQ) 420 (hereinafter also referred to as a "queue pair") and a cache 800.

The ITQ 410 retains communication data transmitted from the I/O request reception program 620 to the storage program 700. The TIQ 420 retains communication data transmitted from the storage program 700 to the I/O response transmission program 640. The ITQ 410 and the TIQ 420 which form the same queue pair are used as a pair in an actual process. When a plurality of queue pairs is present, the storage program 700 needs to use the TIQ 420 and the ITQ 410 which are paired with each other during a series of communication. Moreover, one storage program 700 may exclusively process one queue pair and a plurality of storage programs 700 may collaboratively process one queue pair.

Figure 2:
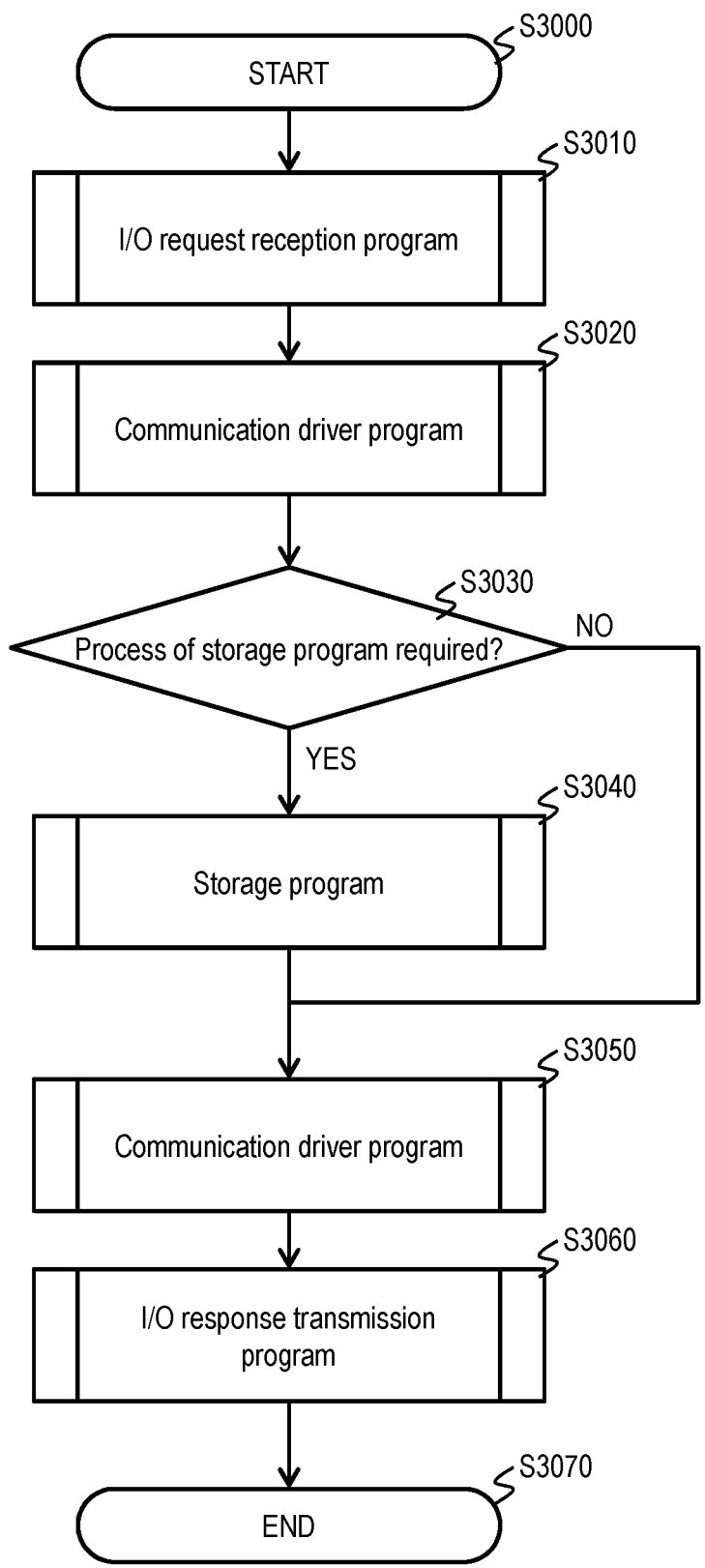
FIG. 2 is a flowchart illustrating an outline of an I/O process.

A broken line in FIG. 1 illustrates the flow of control information. In the following description, the control information is an I/O request or an I/O response. Moreover, FIG. 2 is a flowchart illustrating an outline of an I/O process. Hereinafter, an outline of an I/O process when the server 200 receives an I/O request with respect to the logical volume 340 from the host 210 will be described with reference to FIG. 1 and FIG. 2.

The host 210 transmits an I/O request with respect to the logical volume 340 to the server 200. When the server 200 receives the I/O request from the host 210, an HBA 331 or an NIC 332 included in the server 200 issues an I/O interrupt request. A CPU core 311 receives the I/O interrupt request and starts the I/O process illustrated in FIG. 2 (S3000).

The CPU core 311 having received the I/O interrupt request calls the I/O request reception program 620 (S3010). The CPU core 311 executes the I/O request reception program 620 and receives an I/O request. The CPU core 311 records the received I/O request in a memory 320 and issues an I/O request arrival notification to the communication driver program 500. After that, the CPU core 311 ends the process of the I/O request reception program 620. A broken line C1 in FIG. 1 illustrates the flow of control information (in this example, the I/O request) when S3010 and S3020 are executed.

Subsequently, the CPU core 311 calls the communication driver program 500 (S3020), executes the communication driver program 500, and determines the necessity to perform a process of the storage program 700 (S3030).

Here, when "YES" is obtained in step S3030 (that is, when it is determined that the process of the storage program 700 is necessary), the CPU core 311 enqueues an I/O request to the ITQ 410. A broken line C2 in FIG. 1 illustrates the flow of control information (in this example, an I/O request) when "YES" is obtained in step S3030.

The I/O request enqueued to the ITQ 410 is processed by the storage program 700 operating on the OS 600 (S3040). The storage program 700 enqueues an I/O response to the TIQ 420 and calls the communication driver program 500 using a system call. A broken line C3 in FIG. 1 illustrates the flow of control information (in this example, an I/O request or an I/O response) when S3040 is executed.

The CPU core 311 executes the communication driver program 500 called by a system call, dequeues the I/O response of the storage program 700 from the TIQ 420, and notifies the I/O response transmission program 640 of the I/O response (S3050). A broken line C4 in FIG. 1 illustrates the flow of control information (in this example, an I/O response) when S3050 is executed.

On the other hand, when "No" is obtained in step S3030 (that is, when it is determined that the process of the storage program 700 is not necessary), the CPU core 311 does not notify the storage program 700 of an I/O request by not enqueuing the I/O request to the ITQ 410. In this case, the CPU core 311 executes the communication driver program 500 and outputs an I/O response. For example, when the I/O request is a read request, the CPU core 311 calls the I/O response transmission program 640 and notifies an address and a size of the cache 800 in which read target data is present (S3050). A broken line C6 in FIG. 1 illustrates the flow of control information (in this example, an I/O request or an I/O response) when "No" is obtained in step S3030.

Subsequently, the CPU core 311 executes the I/O response transmission program 640 and outputs an I/O response to the host 210 (S3060). The called I/O response transmission program 640 transmits an I/O completion notification to the host 210 as a response to the I/O request.

For example, when the I/O request is a read request, the CPU core 311 instructs the HBA 331 or the NIC 332 to transmit read data to the host 210. This instruction includes the address and the size of the cache 800 in which read target data notified via the I/O response is present. The HBA 331 or the NIC 332 refers to the address and the size of the cache 800, reads read data from the corresponding area of the cache 800, and transmits the read data to the host 210. Moreover, the CPU core 311 instructs the HBA 331 or the NIC 332 to transmit an I/O process (read process) completion notification to the host 210 (S3170).

Moreover, when the I/O request is a write request, for example, the CPU core 311 instructs the HBA 331 or the NIC 332 to transmit an I/O process (write process) completion notification to the host 210.

When the I/O process completion process is transmitted to the host 210, the I/O process illustrated in FIG. 2 ends (S3070). The broken line C5 in FIG. 1 illustrates the flow of control information (in this example, an I/O response) when S3060 is executed.

Therefore, in the flowchart of the I/O process illustrated in FIG. 2, when "YES" is obtained in step S3030 (that is, when it is determined that the process of the storage program 700 is necessary), the flow of the control information indicated by the broken lines C1, C2, C3, C4, and C5 illustrated in FIG. 1 is created. On the other hand, when "No" is obtained in step S3030 (that is, when it is determined that the process of the storage program 700 is not necessary), the flow of the control information indicated by the broken lines C1, C6, and C5 illustrated in FIG. 1 is created.

Here, the storage program 700 is not a program included in the OS 600 but operates on the OS 600. Due to this, when all I/O requests with respect to the logical volume 340 that the storage program 700 provides to the host 210 are processed by the storage program 700, for example, the traffic between the OS 600 and the storage program 700 increases. In this way, there is a possibility that the I/O performance may decrease due to insufficiency of the I/O bandwidth and an increase in the processes executed by the CPU core 311.

Therefore, in the present embodiment, the communication driver program 500 determines the necessity to perform the process of the storage program 700 (S3030). When the process of the storage program 700 is not necessary, although the storage program 700 provides the target logical volume 340 of an I/O request, the storage program 700 does not process the I/O request. In this way, when an I/O response can be output without using the storage function of the storage program 700, by allowing the communication driver program 500 to output the I/O response, it is possible to suppress a decrease in the I/O performance and to maintain or improve the I/O performance while operating the storage program 700 on the OS 600. For example, upon receiving a write request with respect to the logical volume 340 from the host 210, the OS 600 communicates with the storage program 700 via a queue pair. Moreover, the storage program 700 executes a process based on the write request. On the other hand, when a read request with respect to the logical volume 340 is received from the host 210 and it is determined by referring to a cache management table 900 that data corresponding to the read request is present on the cache 800, the OS 600 outputs a response with respect to the read request to the host 210 on the basis of the data present on the cache 800.

FIG. 1 illustrates an example in which one process of the I/O request reception program 620 and one process of the I/O response transmission program 640 are disposed in one OS 600 (OS kernel 610). However, the present invention is not limited to this configuration but a plurality of processes of the I/O request reception program 620 and a plurality of processes of the I/O response transmission program 640 may be disposed in one OS 600 (OS kernel 610).

Figure 3:
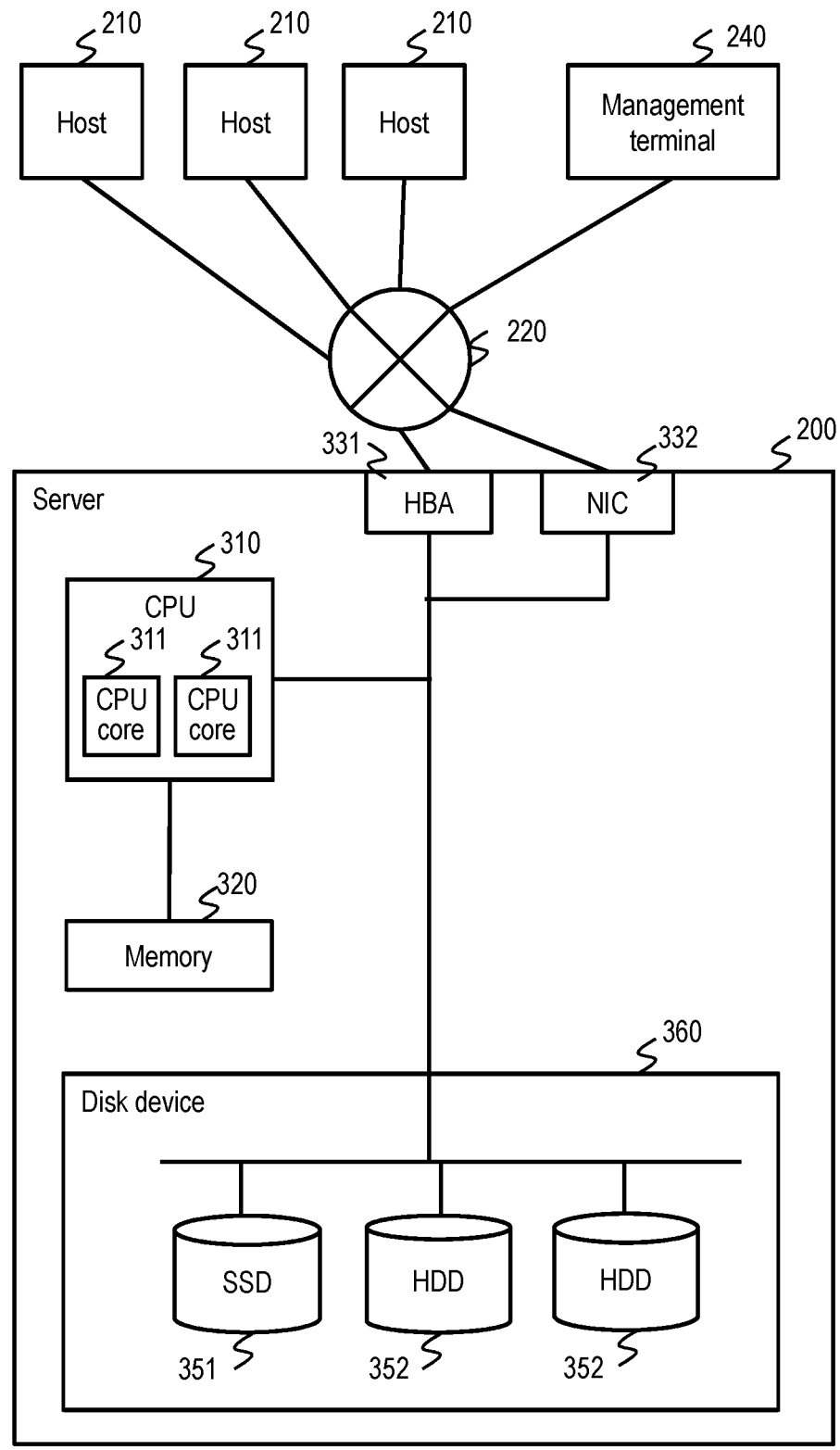
FIG. 3 is a diagram illustrating a configuration example of a computer system 10.

FIG. 3 is a diagram illustrating a configuration example of the computer system 10. The computer system 10 includes the server 200, the host 210, and the management terminal 240. The server 200, the host 210, and the management terminal 240 are coupled to each other by a network 220.

The server 200 is a computer capable of processing a plurality of data communication protocols. For example, the server 200 performs data communication with the host 210 and the management terminal 240 using a data communication protocol such as an FCP (Fiber Channel Protocol), an iSCS (Internet Small Computer System Interface), an NFS (Network File System), a CIFS (Common Internet File System), and an HTTP (Hyper Text Transfer Protocol).

The server 200 receives the I/O request from the host 210 via the network 220, executes an I/O process, and then, returns a process result (I/O response) to the host 210. The server 200 may be installed fixedly in a facility such as a data center and may be movable like a container-type server or the like so that a geographical location thereof can be changed as necessary. Moreover, the server 200 may be configured as a plurality of computers rather than one computer.

The management terminal 240 is a management computer that manages software, various settings and the like of the server 200. The management terminal 240 stores a management program and performs various processes related to management of the server 200 by executing the management program.

The network 220 may have an arbitrary form as long as the network is a communication network. The network 220 is the Internet, a LAN (Local Area Network), a WAN (Wide Area Network), a SAN (Storage Area Network), a wireless LAN, a cellular communication network, and the like, for example. Moreover, the network 220 may be configured as a plurality of types of communication networks rather than a single communication network.

The host 210 may be installed fixedly in a facility such as a data center and may be movable like a container-type host or the like so that a geographical location thereof can be changed. Examples of the host 210 include a cellular phone including a smartphone, a general-purpose computer, and the like, for example. Moreover, the host 210 may be configured as a plurality of different computers rather than a single device.

In the present embodiment, although the server 200 is illustrated as an example of a computer, the present invention is not limited thereto. As another example, a storage system may be used. In the present embodiment, the server 200 may be a computer, a storage system, or a storage device.

The server 200 includes the memory 320, the HBA (Host Bus Adaptor) 331, the NIC (Network Interface Card) 332, a disk device 360, and a CPU 310 which is a control arithmetic unit coupled to these components.

Another storage resource may be used instead of or in addition to the memory 320. Another communication interface device may be used instead of or in addition to the HBA 331 and the NIC 332.

The CPU 310 executes a computer program stored in the memory 320. The CPU 310 includes a plurality of CPU cores 311 which are arithmetic units and the respective cores can operate independently and execute a computer program in parallel.

The CPU core 311 is a processor core that reads various programs including the storage program 700, the OS 600, the I/O request reception program 620, and the I/O response transmission program 640 from the memory 320 and executes the programs. The CPU core 311 may be referred to as a processor.

The memory 320 stores a computer program and other data. The memory 320 may include the cache 800 that temporarily stores data received from the host 210 and data to be transmitted to the host 210.

The HBA 331 is coupled to the network 220, and the NIC 332 is coupled to the network 220 such as a LAN, a WAN, and the Internet. The HBA 331 and the NIC 332 are used for data communication with the management terminal 240 and the host 210.

The disk device 360 includes an SSD (Solid State Drive) 351 and an HDD (Hard Disk Drive) 352 which are secondary storage devices of the server 200. The secondary storage device is a storage and stores data of the I/O process. The numbers of SSDs 351 and HDDs 352 are not particularly limited and are not limited to the numbers illustrated in FIG. 3. Moreover, although the disk device 360 is typically the SSD 351 and the HDD 352, the disk device 360 may be any device capable of storing blocks of data. In the present embodiment, although the disk device 360 is illustrated as an example of a storage device, the present invention is not limited thereto. As another example, the disk device 360 may be a device including a tape archive or an optical disc library such as DVD or CD. In the following description, the SSD 351 and the HDD 352 will be collectively referred to as the disk device 360. In the present embodiment, the disk device 360 may be referred to as a storage device.

Figure 4:
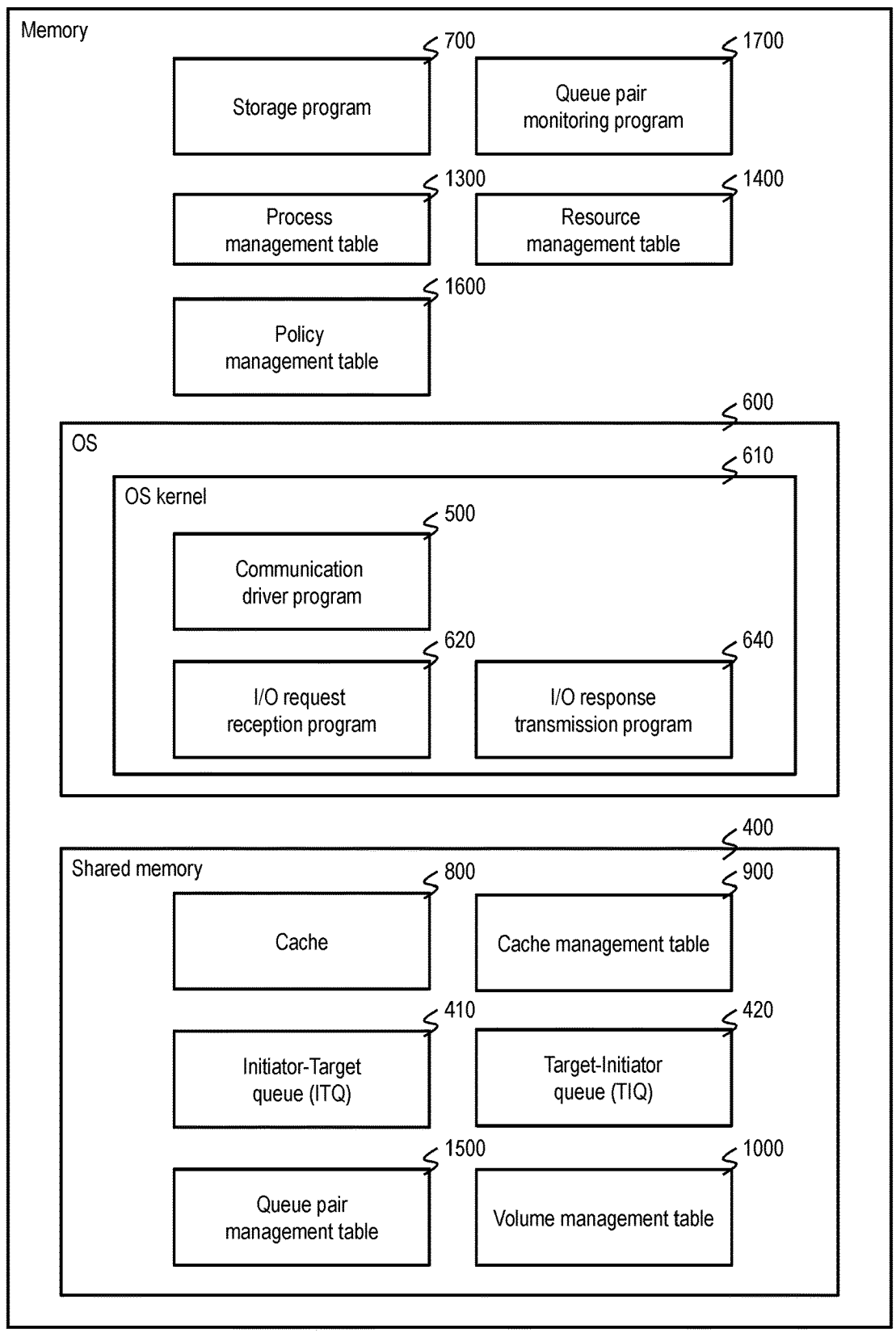
FIG. 4 is a diagram illustrating a configuration example of a memory 320 of a server 200.

FIG. 4 is a diagram illustrating a configuration example of the memory 320 of the server 200. The storage program 700, a queue pair monitoring program 1700, a process management table 1300, a resource management table 1400, a policy management table 1600, and the OS 600 are stored in the memory 320. The OS 600 includes an OS kernel 610. The OS kernel 610 includes the communication driver program 500, the I/O request reception program 620, and the I/O response transmission program 640.

The memory 320 has a shared memory 400 which is an area accessible from the storage program 700, the queue pair monitoring program 1700, and the OS 600. The shared memory 400 includes the cache 800, the cache management table 900, the Initiator-Target queue (ITQ) 410, the Target-Initiator queue (TIQ) 420, a queue pair management table 1500, and a volume management table 1000. The program or the management information illustrated in FIG. 4 is loaded from the disk device 360 and is stored in the memory 320.

The communication driver program 500 implements communication between the storage program 700 and the I/O request reception program 620 and the I/O response transmission program 640. The communication driver program 500 delivers communication from the OS kernel 610 to the storage program 700 via the TIQ 420. The communication driver program 500 delivers communication from the storage program 700 to the OS kernel 610 via the ITQ 410.

The I/O request reception program 620 receives an I/O request from the host 210 using a communication protocol such as FCP/iSCSI or the like and transmits the received I/O request (input/output request) to the storage program 700 via the communication driver program 500.

The I/O response transmission program 640 receives an I/O response from the storage program 700 via the communication driver program 500 and transmits the I/O response to the host 210.

The storage program 700 writes data to the disk device 360 according to the I/O request from the host 210 using the communication protocol such as FCP/iSCSI or the like while using the cache 800 or reads data from the disk device 360 while using the cache 800. The storage program 700 is a program operating on the OS kernel 610 and is a program that executes a process of writing data to a storage (the disk device 360) or a process of reading data from a storage (the disk device 360). The storage program 700 is a program that executes a storage function such as snapshot or RAID. The storage program 700 may be referred to as a storage process program, a storage process, or a storage function.

The storage cache (the cache) 800 temporarily stores data to be written to the disk device 360 or block data (data) read from the disk device 360. The description "the host 210 writes block data to the logical volume 340" means that actually, the storage program 700 writes block data to the cache 800 or the disk device 360. Similarly, the description "the host 210 reads block data from the logical volume 340" means that actually, the storage program 700 reads block data from the cache 800 or the disk device 360.

The logical volume 340 is managed by the volume management table 1000.

In general, upon receiving a request (write request) to write data to the logical volume 340 from the host 210, the storage program 700 temporarily writes data to the cache 800 having a high access speed, and then, issues a write completion notification to the host 210 as an I/O response. Moreover, the data stored in the cache 800 is written to the disk device 360 asynchronously with the write request from the host 210. In this way, even when the disk device 360 has low performance, it is possible to improve the I/O performance of the system with the aid of the performance of the cache 800.

In the present embodiment, the storage program 700 performs the I/O process using polling in order to achieve high response performance and high throughput performance.

The cache 800 is used for temporarily storing data to be written to the disk device 360 or block data read from the disk device 360. In the example of FIG. 4, although the cache 800 is disposed inside the memory 320, the embodiment is not limited thereto. From the fault tolerance respect, data may be stored in a nonvolatile semiconductor memory separately from the storage program 700, and a storage device in which the access speed is slower than semiconductor memories may be used as a part of the cache 800.

The cache management table 900 is a table for managing the state of block data stored in the cache 800. For example, an address on the cache 800, a storage destination volume address, and a data size of the block data stored in the cache 800 are stored. The cache management table 900 may be referred to as cache management information.

The volume management table 1000 is a table that stores information on the logical volume 340. For example, a volume number, a volume attribute, and a volume state of each logical volume 340 are stored. The volume management table 1000 may be referred to as volume management information.

The TIQ 420 is an area for recording data when the storage program 700 transmits the data to the I/O response transmission program 640 via the communication driver program 500. The TIQ 420 has a FIFO (First In First Out)-type data structure.

The ITQ 410 is an area for recording data when the I/O request reception program 620 communicates the data to the storage program 700 via the communication driver program 500. The ITQ 410 has a FIFO-type data structure.

The process management table 1300 is a table for managing information on the storage program 700 operating within the server 200. A process ID of the storage program 700 being activated and an ID of a queue pair monitored by the storage program 700 are stored in the process management table 1300.

The resource management table 1400 is a table for managing resources possessed by the server 200. The number of ports of the HBA 331 coupled to the server 200, the number of ports of the NIC 332, a memory volume used as the shared memory 400 within the memory 320, and a memory volume used as the cache 800 within the memory volume used as the shared memory 400 are stored in the resource management table 1400.

The queue pair management table 1500 is a table for managing the pair (hereinafter referred to simply as a queue pair) of the TIQ 420 and the ITQ 410 stored on the shared memory 400. A queue pair ID for identifying information stored in the queue pair, a starting address of the TIQ 420, a starting address of the ITQ 410, and a queue size are stored in the queue pair management table 1500.

The policy management table 1600 is a table for managing a policy for increasing or decreasing the number of queue pairs. A policy that determines a condition under which the number of queue pairs will be increased and a condition under which the number of queue pairs will be decreased is stored in the policy management table 1600. The policy management table 1600 may be referred to as queue pair increase/decrease policy management information.

The queue pair monitoring program 1700 is a program that periodically monitors the process management table 1300, the resource management table 1400, the queue pair management table 1500, and the policy management table 1600 and increases or decreases the number of queue pairs depending on the situation. The queue pair monitoring program 1700 may be a part of the storage program 700 and may be a different program from the storage program 700.

Figure 5:
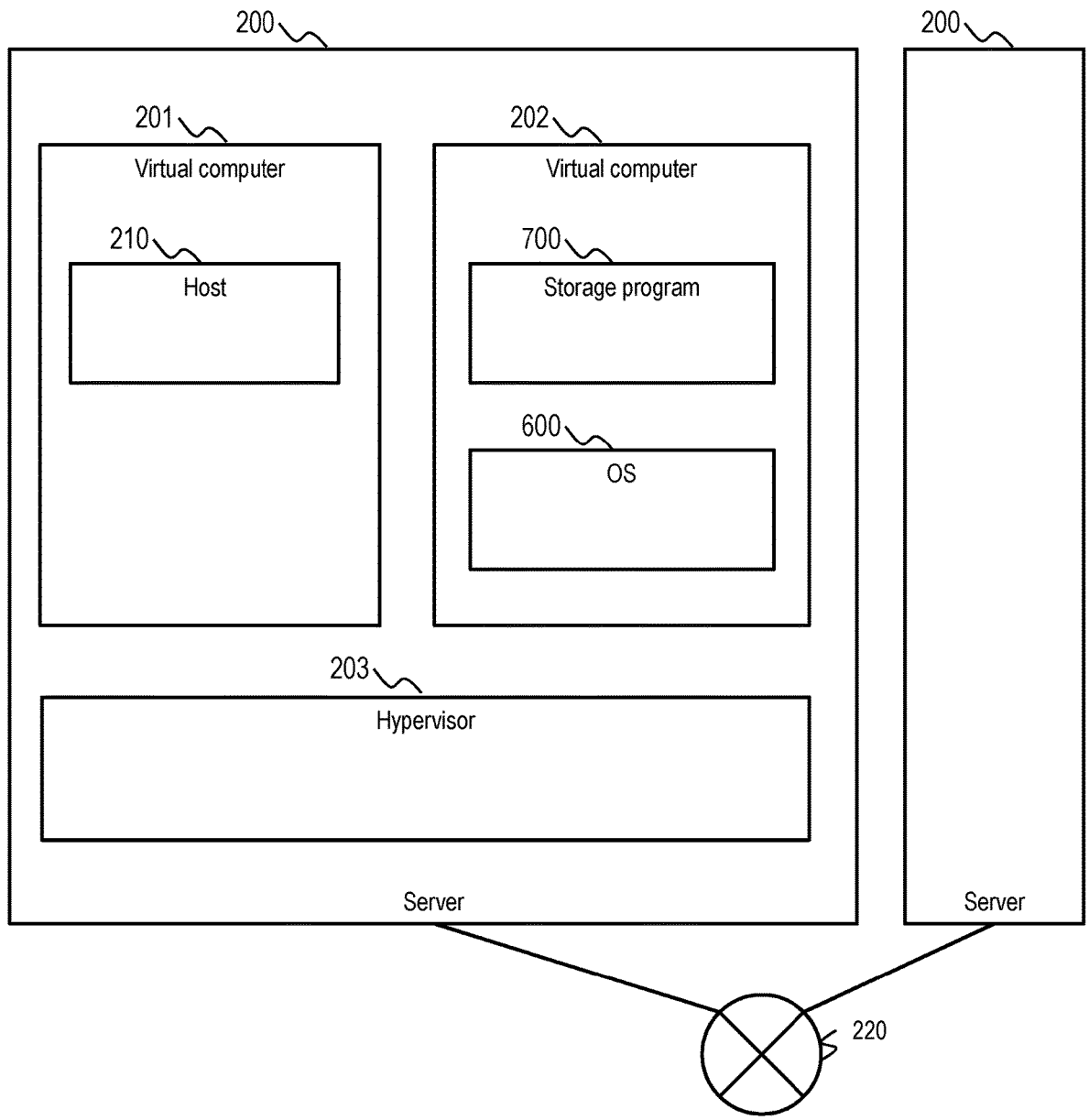
FIG. 5 is a diagram illustrating another configuration example of the computer system 10.

FIG. 5 is a diagram illustrating another configuration example of the computer system 10. As illustrated in FIG. 5, a hypervisor 203 may operate in the server 200, and one or a plurality of virtual computers 202 may operate on the hypervisor 203. The OS 600, the storage program 700, and the queue pair monitoring program 1700 may operate on the virtual computer 202. That is, the respective programs illustrated in FIG. 4 may operate on hardware of a physical computer and may operate on a virtual computer. Moreover, the host 210 may be a host program operating on a virtual computer and may be a physical host computer. A virtual computer on which the OS 600, the storage program 700, and the queue pair monitoring program 1700 operate and a virtual computer on which a host program operates may be disposed on the same server 200 and may be disposed on another server 200 coupled thereto via the network 220.

FIG. 6 is a diagram illustrating a configuration example of the Initiator-Target queue (ITQ) 410. FIG. 7 is a diagram illustrating a configuration example of the Target-Initiator queue (TIQ) 420.

The ITQ 410 illustrated in FIG. 6 has a FIFO-type data structure. I/O requests that the I/O request reception program 620 has received from the host 210 are sequentially enqueued to the ITQ 410.

The TIQ 420 illustrated in FIG. 7 also has a FIFO-type data structure. I/O responses that the storage program 700 returns with respect to the I/O requests received from the I/O request reception program 620 via the communication driver program 500 are sequentially enqueued to the TIQ 420. The I/O response may be referred to as an I/O process completion notification.

In the example of FIG. 6, two I/O requests are stored in the ITQ 410. The I/O request may include information indicating a volume number 1110, an I/O type 1120, a volume address 1130, and a data size 1140 of the target logical volume 340 of the I/O request. Furthermore, when the I/O type 1120 is "Write", information indicating a memory address 1150 of the memory 320 in which write data is stored may be included in the I/O request. For example, according to FIG. 6, as for the I/O request stored earlier, the target volume number 1110 is "1", the I/O type 1120 is "Read", the volume address 1130 is "0x100", and the data size 1140 is "0x100". As for the I/O request stored later, the target volume number 1110 is "2", the I/O type 1120 is "Write", the volume address 1130 is "0x3000", the data size 1140 is "0x400", and the memory address 1150 is "0x58000". An I/O request of which the I/O type 1120 is "Write" may be referred to as a write request. An I/O request of which the I/O type 1120 is "Read" may be a read request.

In the example of FIG. 7, two I/O responses (I/O process completion notifications) are stored in the TIQ 420. The I/O response may include information indicating a volume number 1210, an I/O type 1215, a volume address 1220, and a data size 1225 of the target logical volume 340 of the I/O response. Furthermore, when the I/O type 1120 is "Read", information indicating the memory address 1230 of the memory 320 (the cache 800) in which read data is stored may be included in the I/O response. As for the I/O response stored earlier, the volume number 1210 is "1", the I/O type 1215 is "Read", the volume address 1220 is "0x100", the data size 1225 is "0x100", and the memory address 1230 is "0x58000". As for the I/O response stored later, the volume number 1210 is "2", the I/O type 1215 is "Write", the volume address 1220 is "0x300", and the data size 1225 is "0x400".

FIG. 8 is a diagram illustrating a configuration example of the volume management table 1000. Information on the logical volume 340 managed by the storage program 700 is recorded in the volume management table 1000. For example, the information on the logical volume 340 is recorded in the volume management table 1000 when the storage program 700 creates the logical volume 340. In the example of FIG. 8, the volume management table 1000 has a number of rows corresponding to the number of logical volumes 340 created by the storage program 700.

The volume management table 1000 includes a volume number 1010, a volume state 1020, a volume size 1030, a volume address 1035, a disk device number 1040, a disk device address 1050, and a storage function 1060 as the information on the logical volume 340.

A volume ID for uniquely identifying the logical volume 340 is stored in the volume number 1010. Information indicating whether I/O to the logical volume 340 is enabled or disabled is stored in the volume state 1020. In this example, "I/O enabled" or "I/O disabled" is stored. The volume of the logical volume 340 is stored in the volume size 1030.

A logical address on the logical volume 340 is stored in the volume address 1035. An identifier of the disk device 360 that forms the logical volume 340 is stored in the disk device number 1040. The disk device address 1050 is an address of a physical storage area correlated with the volume address 1035, and an address on the disk device 360 identified by the disk device number 1040 is stored in the disk device address 1050. In the example of FIG. 8, a logical storage area of a logical volume 340 of a predetermined size (for example, "0x100") from the volume address 1035 is correlated with a physical storage area of the disk device 360 of a predetermined size from the disk device address 1050. The predetermined size is not limited to the example illustrated in FIG. 8, and the storage areas may not necessarily be managed in respective fixed sizes.

The volume management table 1000 may manage all storage areas of the logical volume 340 in correlation with the physical storage areas of the disk device 360. Alternatively, the correlation between the physical storage area of the disk device 360 in which the data of the logical volume 340 is stored and the storage area of the logical volume 340 may be managed using the volume management table 1000. In this case, when there is a write request with respect to a storage area of a remaining logical volume 340, the storage program 700 may allocate a physical storage area of the disk device 360 and may manage the correlation between the storage area of the logical volume 340 and the physical storage area of the disk device 360 using the volume management table 1000.

A storage function to be applied to the logical volume 340 is stored in the storage function 1060. An example of the storage function includes snapshot, RAID, and the like. When a predetermined storage function which requires the process of the storage program 700 when the server 200 receives an I/O request is applied to the logical volume 340, information (for example, "Yes") indicating the note thereof may be stored in the storage function 1060.

According to the example of FIG. 8, as for the logical volume 340 having the volume number 1010 of "1", the volume state 1020 is "I/O enabled", the volume size 1030 is "1TB", and RAID and snapshot are applied as the storage function 1060.

FIG. 9 is a diagram illustrating a configuration example of the cache management table 900. Information on the data that the storage program 700 has stored in the cache 800 is stored in each row of the cache management table 900. The stored information includes a volume number 910, a volume address 920, a data size 930, a memory address 940, and a data status 950.

The cache management table 900 includes a number of rows corresponding to the number of items of data stored in the cache 800. The cache management table 900 has a volume capable of at least managing an amount of data corresponding to the volume of the cache 800.

A volume ID managed by the volume management table 1000, of the logical volume 340, to which the data stored in the cache 800 belongs, is stored in the volume number 910.

An address on the logical volume 340, of the data stored in the cache 800 is stored in the volume address 920. The data size 930 indicates the size of data stored in the cache 800. The memory address 940 indicates an address on the cache 800, of the data.

In the data status 950, "Clean" indicating a state in which data write to the disk device 360 has been finished, "Dirty" indicating a state in which data write to the disk device 360 has not been completed, and "Reading" or "Writing" indicating a process state of the storage program are stored for the data on the cache 800.

FIG. 9 illustrates the cache management table 900 when five items of data are stored in the cache 800. For example, data of which the volume number 910 is "1", the volume address 920 is "0x100", the data size 930 is "0x400", the memory address 940 is "0x0000", and the data status 950 is "Clean" is illustrated in a certain row.

FIG. 10 is a diagram illustrating a configuration example of the process management table 1300. The information on the storage program 700 being activated (executed) is stored in each row of the process management table 1300. The stored information includes a process ID 1310 and a queue pair ID 1320. The process management table 1300 includes a number of rows corresponding to the number of processes being activated (executed) by the storage program 700.

A process ID which is an identifier of a process of the storage program 700 being activated (executed) is stored in the process ID 1310. A queue pair ID managed by the queue pair management table 1500, of the queue pair used by the storage program 700 being activated is stored in the queue pair ID 1320.

FIG. 10 illustrates the process management table 1300 when there are two storage programs 700 being activated. For example, an activated storage program 700 of which the process ID 1310 is "2000" and the queue pair ID 1320 is "1,2" is illustrated in row 1330.

FIG. 11 is a diagram illustrating a configuration example of the resource management table 1400. Information on resources coupled to the server 200 is illustrated in each row of the resource management table 1400. The resources include the memory 320, the HBA 331, and the NIC 332. The information on resources includes a resource type 1410 and a resource volume 1420 for each resource.

The resource management table 1400 includes a number of rows corresponding to the sum of the number of port types of the HBA 331, the number of port types of the NIC 332, the number of shared memories, and the number of caches.

Any one of a port type of the HBA 331, a port type of the NIC 332, a shared memory, and a cache coupled to the server 200 is stored in the resource type 1410.

The number of ports of the HBA 331 or the NIC 332 coupled to the server 200 and the volume of the shared memory or the cache 800 are stored in the resource volume 1420.

FIG. 11 illustrates the resource management table 1400 in which the HBA 331 of which the port type is an FC port, the NIC 332 of which the port type is an Ethernet port (Ethernet is a registered trademark), and the cache 800 are illustrated. For example, information on a resource of which the resource type 1410 is "FC port" and the resource volume 1420 is "8" is stored in row 1430.

FIG. 12 is a diagram illustrating a configuration example of the queue pair management table 1500. Information on the queue pair of the TIQ 420 and the ITQ 410 is recorded in each row of the queue pair management table 1500. The recorded information includes a queue pair ID 1510, a TIQ storage starting address 1520, an ITQ storage starting address 1530, a queue size 1540, and a manipulatability 1545.

The queue pair management table 1500 includes a number of rows corresponding to the number of queue pairs of the TIQ 420 and the ITQ 410.

An ID allocated to each queue pair is stored in the queue pair ID 1510.

A starting address of the memory 320 in which the TIQ 420 is stored is stored in the TIQ storage starting address 1520.

A starting address of the memory 320 in which the ITQ 410 is stored is stored in the ITQ storage starting address 1530.

The size of the TIQ 420 and the ITQ 410 is stored in the queue size 1540. Information indicating whether the queue pair can be manipulated or not is stored in the manipulatability 1545. In this example, "Enabled" or "Disabled" is stored.

FIG. 12 illustrates the queue pair management table 1500 when there are four queue pairs. For example, data of which the queue pair ID 1510 is "1", the TIQ storage starting address is "0x800000", the ITQ storage starting address is "0x880000", the queue size is "0x80000", and the manipulatability is "Disabled" is stored in row 1550.

FIG. 13 is a diagram illustrating a configuration example of the policy management table 1600. Information on the policy used for determining whether the number of queue pairs will be increased or decreased is stored in each row of the policy management table 1600. The information on the policy includes a policy item 1610, an upper limit 1620, and a lower limit 1630.

In the present embodiment, the policy item 1610 includes "number of queue pairs processed by storage program", "number of FC ports", "number of Ethernet ports", and "memory volume used by queue pair". An upper limit and a lower limit can be set for "number of queue pairs processed by storage program", and an upper limit can be set for "number of FC ports", "number of Ethernet ports", and "memory volume used by queue pair".

For example, a policy of which the policy item 1610 is "number of queue pairs processed by storage program", the upper limit 1620 is "8", and the lower limit 1630 is "1" is set in row 1640.

The necessity to increase or decrease the number of queue pairs is determined by comparing the number of activated processes of the storage program 700 and the use amount of various resources with the respective upper and lower limits. The number of activated processes of the storage program 700 can be calculated from the process management table 1300.

Various resources include the number of FC ports, the number of Ethernet ports, a shared memory volume, a cache volume, and a memory volume used by the queue pair. The number of FC ports and the number of Ethernet ports are described in the resource management table 1400. The shared memory volume and the cache volume are also described in the resource management table 1400. The memory volume used by the queue pair is calculated from the queue pair management table 1500.

The upper and lower limits of each resource are obtained from the upper or lower limit of each policy item 1610 of the policy management table 1600.

Figure 14:
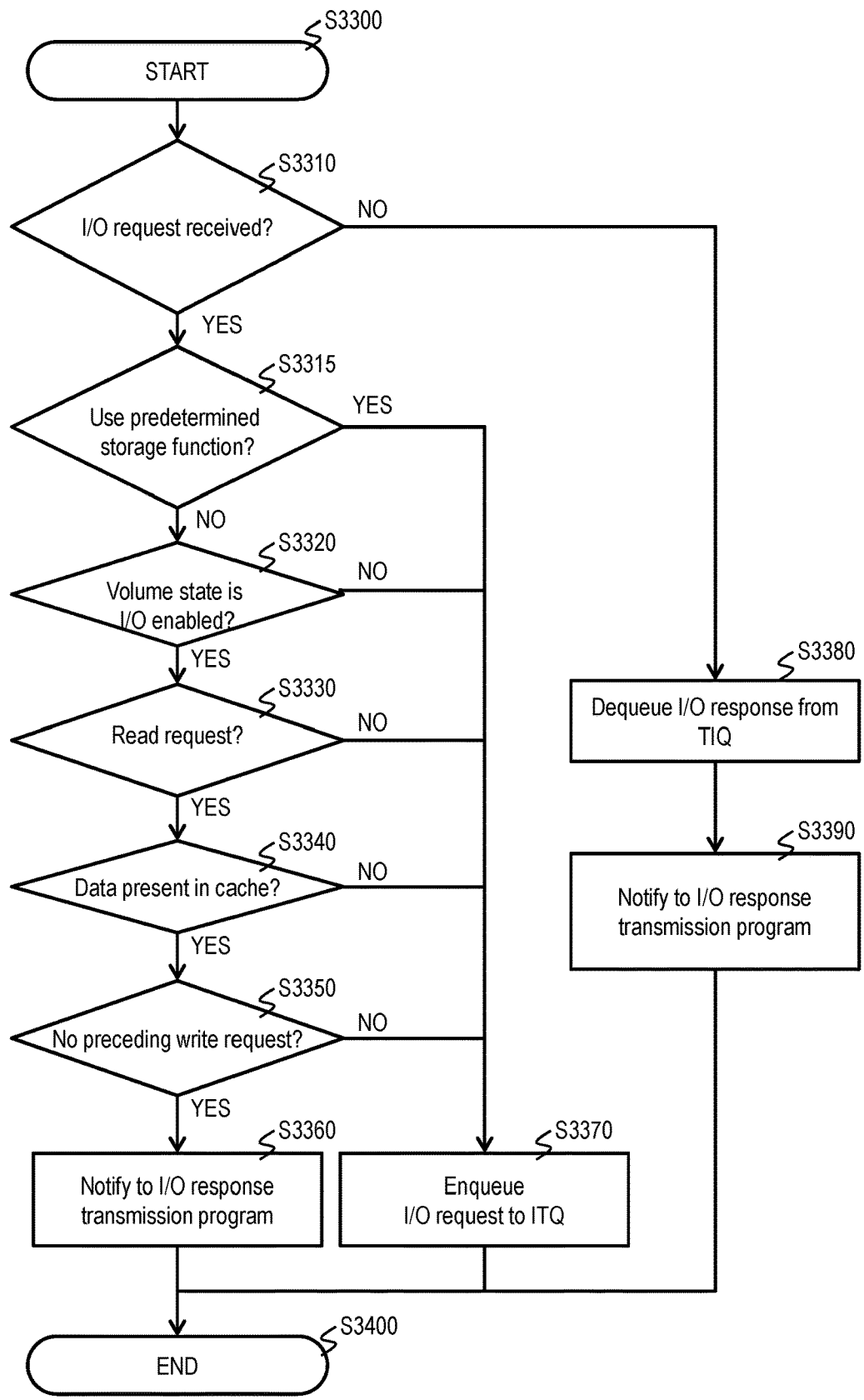
FIG. 14 is a flowchart of a communication driver program 500.

FIG. 14 is a flowchart of the communication driver program 500. Upon receiving an I/O request arrival notification from the I/O request reception program 620, the CPU core 311 starts the process of the communication driver program 500. Alternatively, when the storage program 700 issues a system call, the CPU core 311 starts the process of the communication driver program 500 (S3300).

Subsequently, the CPU core 311 determines whether the communication driver program 500 has received the notification of arrangement of the I/O request (S3310).

When it is determined in step S3310 that the I/O request arrival notification is received (S3310: YES), the CPU core 311 determines whether the target logical volume 340 of the I/O request uses a predetermined storage function 1060 by referring to the volume management table 1000 (S3315). Here, the predetermined storage function is a storage function which requires the process of the storage program 700 when the server 200 receives the I/O request. The predetermined storage function may be set in advance. A portion of the plurality of storage functions included in the storage program 700 may be the predetermined storage function.

When it is determined in step S3315 that the logical volume 340 does not use the predetermined storage function 1060 (S3315: No), the CPU core 311 determines whether the volume state 1020 of the target logical volume 340 of the I/O request is "I/O Enabled" by referring to the volume management table 1000 (S3320).

When it is determined in step S3320 that the volume state 1020 of the logical volume 340 is "I/O Enabled" (S3320: YES), the CPU core 311 determines whether the I/O type of the I/O request is "Read" (S3330).

When it is determined in step S3330 that the type of the I/O request is "Read" (S3330: YES), the CPU core 311 determines whether data is present on the cache 800 with respect to the address and the data size of the target logical volume 340 of the I/O request by referring to the cache management table 900 (S3340).

When it is determined in step S3340 that data is present on the cache 800 with respect to an address range of the target logical volume 340 of the I/O request (S3340: YES), the CPU core 311 determines whether a write request that requests data to be written to an address range of the target logical volume 340 of the I/O request is present in the ITQ 410 (S3350).

When it is determined in step S3350 that a write request with respect to the address range of the target logical volume 340 of the I/O request is not present in the ITQ 410 (S3350: YES), the CPU core 311 issues an I/O process completion notification (I/O response) (S3360). This corresponds to the case of No in step S3030 of FIG. 2 (that is, the CPU core 311 determines that the process of the storage program 700 is not necessary), and the I/O request is not notified to the storage program 700 by not enqueuing the I/O request to the ITQ 410. The CPU core 311 calls the I/O response transmission program 640 and notifies the address and the size of the cache 800 in which read target data is present. The CPU core 311 ends the process of the communication driver program 500 when the process of step S3360 is completed (S3400).

When it is determined in step S3315 that the predetermined storage function is used (S3315: YES), since the target logical volume 340 of the I/O request uses the storage function that requires the process of the storage program 700, the CPU core 311 enqueues the I/O request to the ITQ 410 (S3370).

When it is determined in step S3320 that the volume state 1020 of the logical volume 340 is "I/O Disabled" (S3320: NO), since there is a possibility that the logical volume 340 is in a fault state or is being formatted, the CPU core 311 enqueues the I/O request to the ITQ 410 (S3370).

When it is determined in step S3330 that the I/O type is not "Read" (S3330: NO) (for example, when the I/O type is "Write"), since a cache manipulation process or a storage function such as RAID is used (or is likely to be used), the CPU core 311 enqueues the I/O request to the ITQ 410 (S3370).

When it is determined in step S3340 that data is not present on the cache 800 with respect to a target volume address range of the I/O request (S3340: NO), since there is a possibility that it is necessary for the storage program 700 to read or write data from or to the disk device 360, the CPU core 311 enqueues the I/O request to the ITQ 410 (S3370).

When it is determined in step S3350 that a write request with respect to an address range of the target logical volume 340 of the I/O request is present in the ITQ 410 (S3350: NO), since it is necessary for the storage program 700 to process a present I/O request (read request) after processing the preceding write request, the CPU core 311 enqueues the I/O request to the ITQ 410 (S3370).

When the I/O request is enqueued to the ITQ 410, a state in which the process of the storage program 700 is required is created. The CPU core 311 ends the communication driver program 500 when the process of step S3370 is completed (S3400).

When it is determined in step S3310 that the I/O request is not received (S3310: NO) (that is, the communication driver program 500 is called using a system call), the CPU core 311 dequeues the I/O response from the TIQ 420 (S3380).

Subsequently, the CPU core 311 notifies the I/O response transmission program 640 of the I/O response (S3390). The CPU core 311 ends the communication driver program 500 when the process of step S3390 is completed (S3400).

In this way, the processes of steps S3300 to S3400 are completed. The order of some steps of the determination steps S3310, S3315, S3320, S3330, S3340, and S3350 illustrated in FIG. 14 may be changed, and some steps may be omitted.

When an I/O request to the logical volume 340 is received from the host 210 in step S3315, the OS 600 determines whether it is necessary for the storage program 700 to process the I/O request on the basis of the information on the storage function 1060 applied to the target logical volume 340 of the I/O request by referring to the volume management table 1000. When it is determined that it is necessary for the storage program 700 to process the I/O request, the OS 600 communicates with the storage program 700 via the queue pair. The storage program 700 executes a process based on the I/O request. On the other hand, when it is determined that it is not necessary for the storage program 700 to process the I/O request, the OS 600 issues a response to the I/O request to the host 210. It is possible to suppress a decrease in I/O performance and to maintain or improve the I/O performance while operating the storage program 700 on the OS 600.

The storage program 700 is destaged to the storage device (the disk device 360) after writing data to the cache 800. Upon receiving a data output request, the I/O response transmission program 640 outputs data to the cache 800 when target data of the request is present in the cache 800. On the other hand, when the request target data is not present in the cache 800, the I/O response transmission program 640 notifies the storage program 700 of the request via the ITQ 410. In this way, in a configuration in which a data output process is accelerated by the cache 800, when data is present in the cache 800, the communication driver program 500 can complete the data output process quickly without via the communication using the queue pair and the process of the storage program 700.

Figure 15:
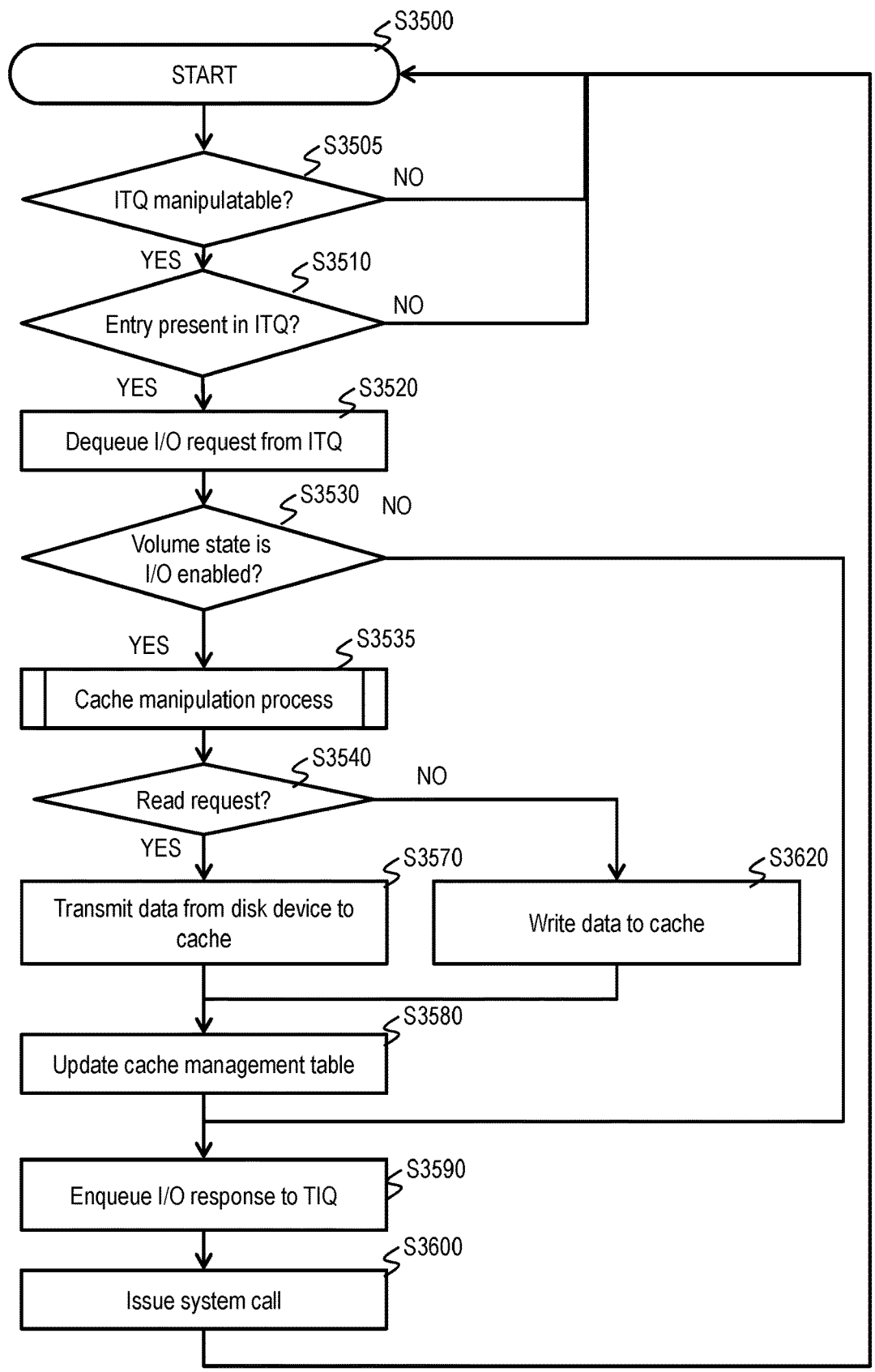
FIG. 15 is a flowchart of a storage program 700.

FIG. 15 is a flowchart of the storage program 700. The CPU core 311 starts the process illustrated in FIG. 15 during activation of the server 200 (S3500). First, the CPU core 311 selects one processing target queue pair among the queue pairs subject to the process being executed of the storage program 700 by referring to the process management table 1300. Although a queue pair selection method is not limited, a method of selecting one queue pair sequentially from a plurality of queue pairs according to a round-robin method may be used, for example.

Subsequently, the CPU core 311 determines whether the selected processing target queue pair is manipulatable or not (the manipulatability 1545) by referring to the queue pair management table 1500 (S3505). When the processing target queue pair is not manipulatable (S3505: NO), the CPU core 311 returns to step S3500 and performs the process again.

When the processing target queue pair is manipulatable (S3505: YES), the CPU core 311 determines whether there is an entry in the ITQ 410 (S3510).

When it is determined in step S3510 that there is no entry in the ITQ 410 (S3510: NO), the CPU core 311 returns to step S3500. On the other hand, when it is determined in step S3510 that there is an entry in the ITQ 410 (S3510: YES), the CPU core 311 dequeues the I/O request from the ITQ 410 (S3520).

Subsequently, the CPU core 311 issues a test command to the target logical volume 340 of the I/O request dequeued from the ITQ 410 and determines whether I/O to the logical volume 340 is enabled (S3530). When it is determined in step S3530 that I/O to the logical volume 340 is disabled (S3530: NO), the CPU core 311 enqueues an error response to the TIQ 420 as an I/O response (S3590).

When it is determined in step S3530 that I/O to the logical volume 340 is enabled (S3530: YES), the CPU core 311 performs the cache manipulation process illustrated in FIG. 16 (S3535). Subsequently, the CPU core 311 determines whether the I/O type of the I/O request dequeued from the ITQ 410 is "Read" (S3540).

When it is determined in step S3540 that the I/O type is "Read" (S3540: YES), the CPU core 311 transmits data of the target logical volume 340 of the I/O request from the disk device 360 to the cache 800 (S3570). Subsequently, the CPU core 311 updates the data status 950 of the target logical volume 340 of the I/O request in the cache management table 900 to "Clean" (S3580).

When it is determined in step S3540 that the I/O type is "Read" (S3540: NO), the CPU core 311 writes data to the cache 800 on the basis of the I/O request (S3620). Subsequently, the CPU core 311 updates the data status 950 of the target logical volume 340 of the I/O request in the cache management table 900 to "Dirty" (S3580).

Subsequently, the CPU core 311 enqueues the I/O response to the TIQ 420 (S3590). The CPU core 311 issues a system call to notify the communication driver program 500 of the fact that enqueuing to the TIQ 420 has been performed (S3600). The CPU core 311 returns to step S3500 when the process of step S3600 ends.

In this way, the process of the storage program 700 is executed through steps S3500 to S3620.

Figure 16:
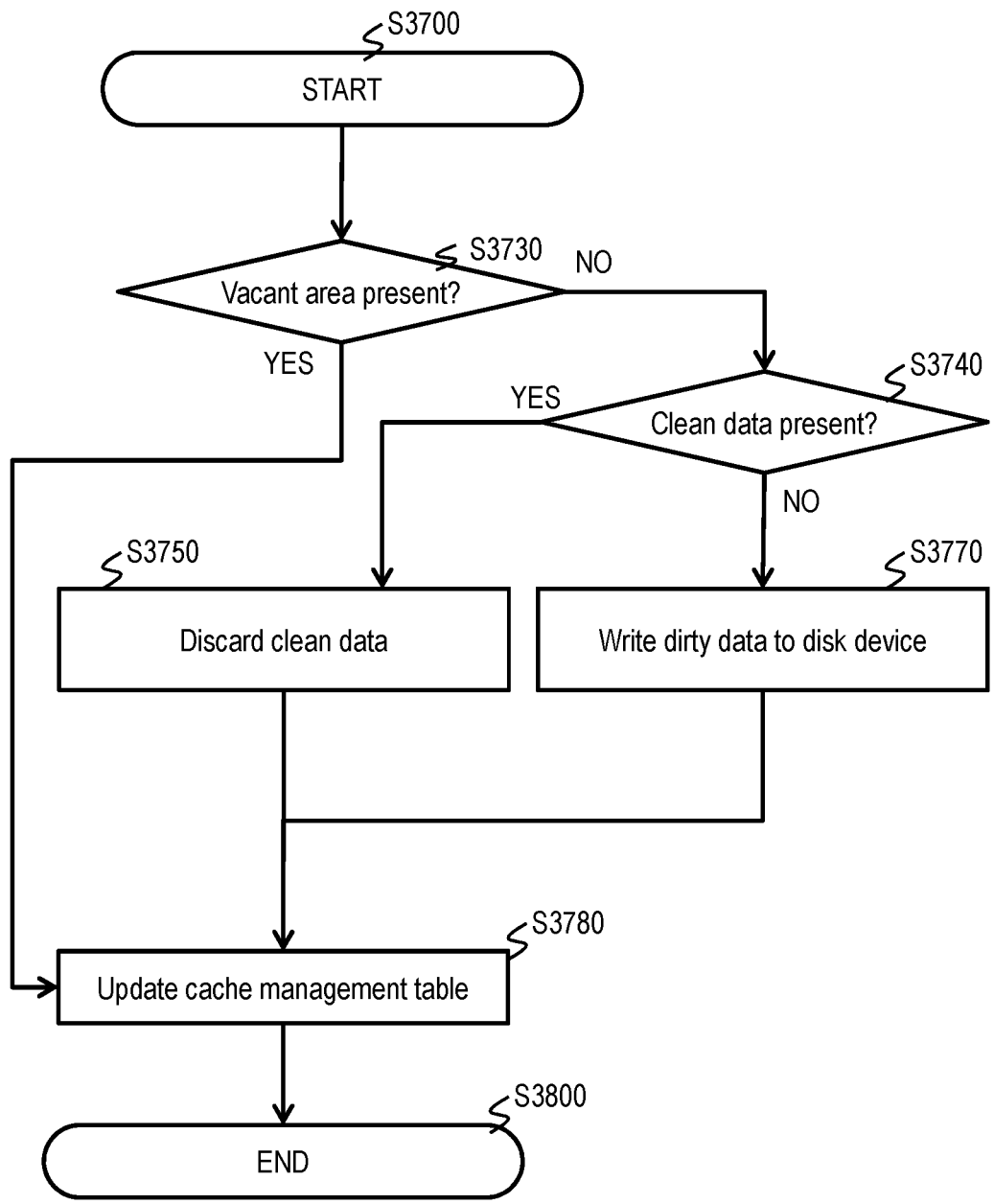
FIG. 16 is a flowchart of a cache manipulation process.

FIG. 16 is a flowchart of the cache manipulation process of S3535 of the storage program 700.

The CPU core 311 determines whether there is a free area in the cache 800 by referring to the cache management table 900 (S3730).

When it is determined in step S3730 that there is a free area in the cache 800 (S3730: YES), the CPU core 311 updates the information of a row indicating the free area of the cache management table 900 in order to use the free area and adds a row indicating an area to be used to thereby update the cache management table 900 (S3780).

When it is determined in step S3730 that there is no free area in the cache 800 (S3730: NO), the CPU core 311 determines whether there is clean data on the cache 800 by referring to the cache management table 900 (S3740).

When it is determined in step S3740 that clean data is present (S3740: YES), the CPU core 311 discards the clean data on the cache 800 (S3750).

Subsequently, the CPU core 311 removes a row on the cache management table 900 corresponding to the discarded clean data and updates the cache management table 900 in order to use the area as a free area (S3780).

When it is determined in step S3740 that there is no clean data (step S3740: NO), the CPU core 311 selects one row indicating dirty data from the cache management table 900, adds "Writing" to the data status 950 of the selected row, and writes the data on the cache 800 to the disk device 360 (S3770).

Subsequently, the CPU core 311 updates the data status 950 of a row on the cache management table 900 corresponding to the data written to the disk device 360 to "Clean" and updates the cache management table 900 in order to use the area as a free area (S3780).

In this way, the cache manipulation process is completed.

Figure 17:
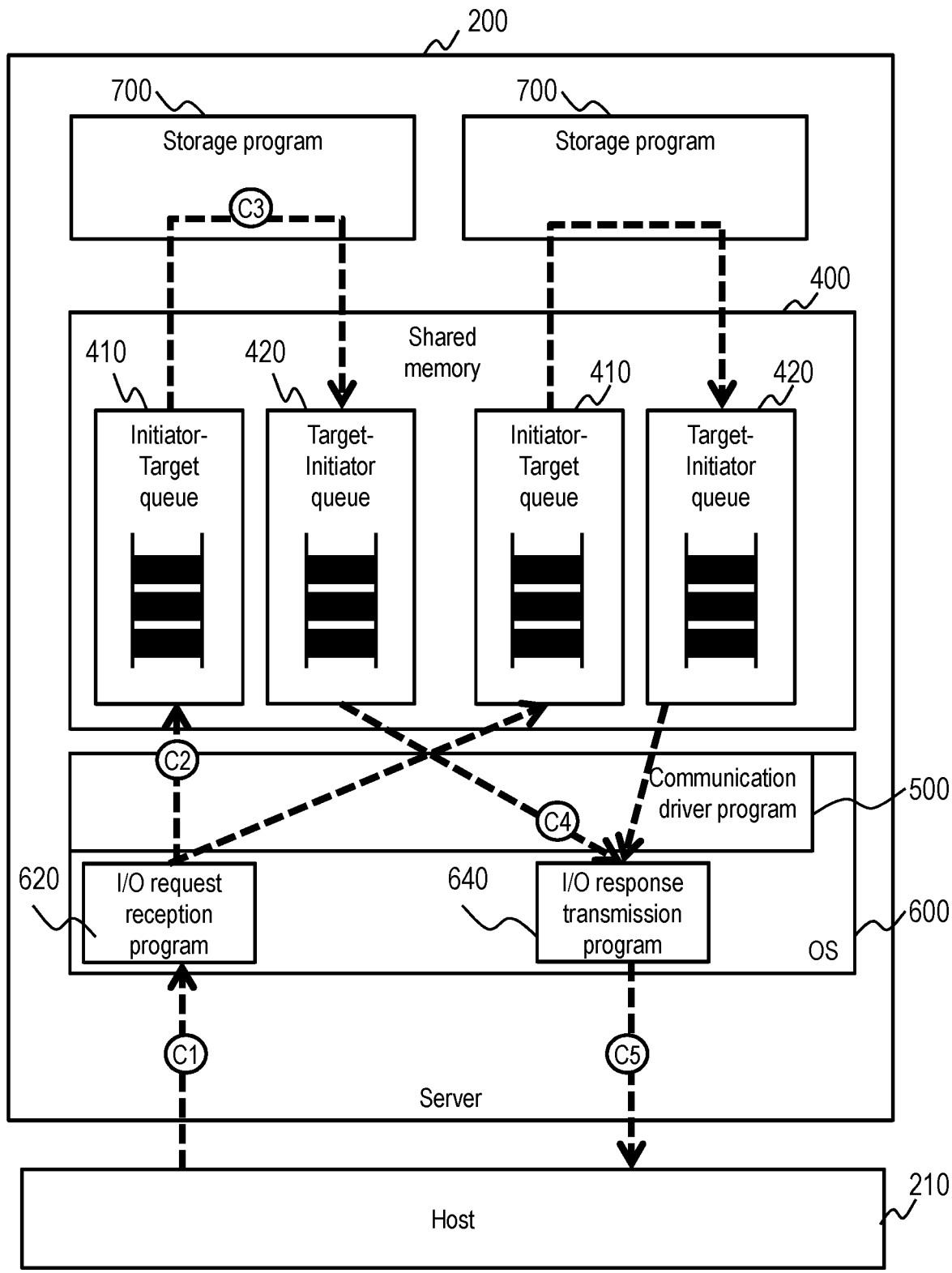
FIG. 17 is a diagram illustrating a configuration example of a server 200 in which a plurality of queue pairs is present.

FIG. 17 is a diagram illustrating a configuration example of the server 200 in which a plurality of queue pairs is present. Although only one queue pair is illustrated in the server 200 of FIG. 1, a plurality of queue pairs may be present in the server 200 as illustrated in FIG. 17. Each process of the storage program 700 may use one or a plurality of queue pairs. Moreover, the number of queue pairs may be dynamically increased or decreased.

Figure 18:
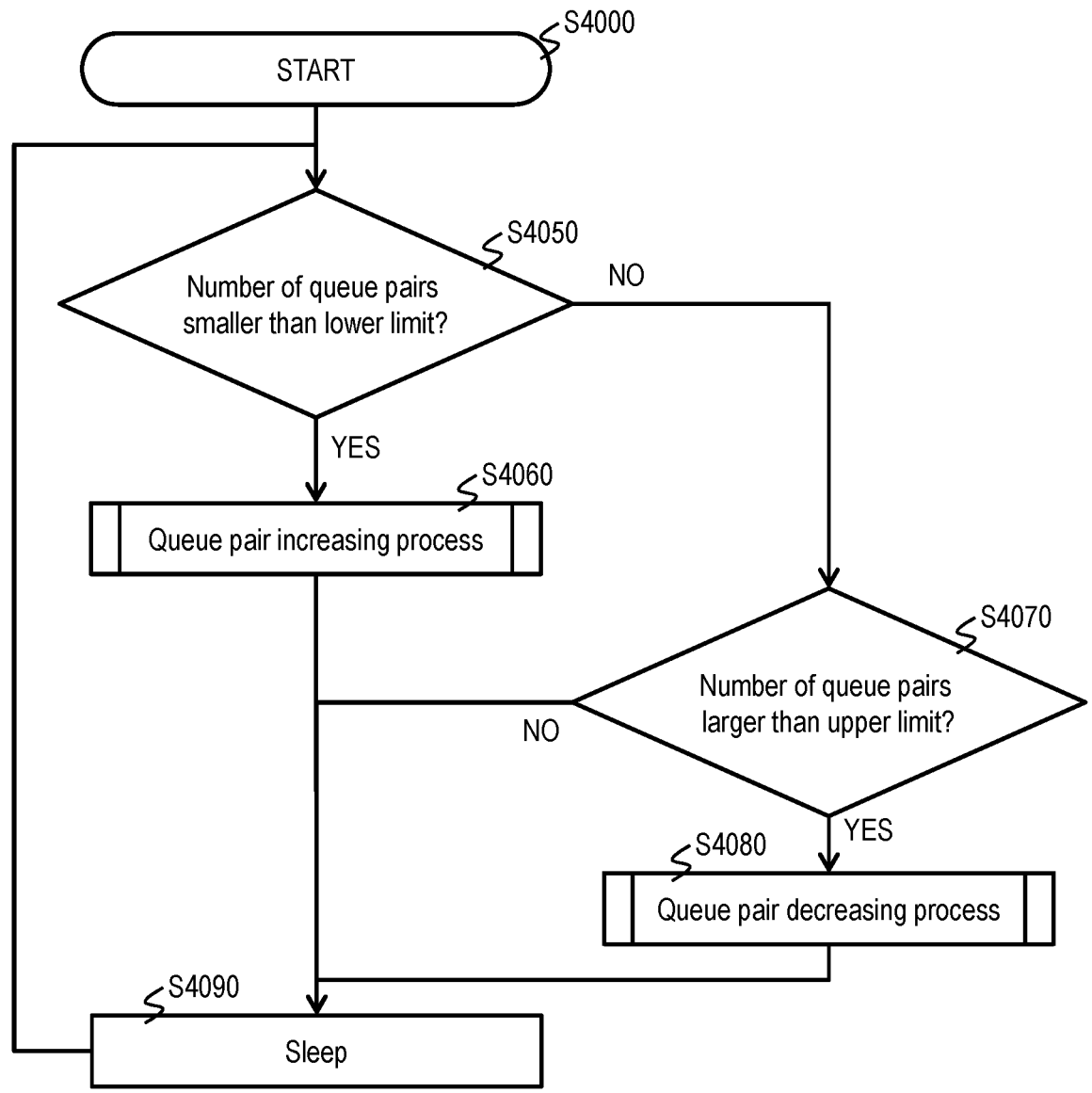
FIG. 18 is a flowchart of a queue pair monitoring program 1700.

FIG. 18 is a flowchart of the queue pair monitoring program 1700. The CPU core 311 starts the process illustrated in FIG. 18 during activation of the server 200 (S4000).

The CPU core 311 controls the number of queue pairs using the ITQ 410 that retains the communication data transmitted from the I/O request reception program 620 to the storage program 700 and the TIQ 420 that retains the communication data transmitted from the storage program 700 to the I/O response transmission program 640 as a pair.

In this case, the CPU core 311 controls the number of queue pairs on the basis of the use amount of resources associated with the queue pair. Here, the examples of resources include the number of queue pairs processed by the storage program 700, the number of FC ports, the number of Ethernet ports, and a memory volume used by the queue pair. Since the number of queue pairs is controlled on the basis of the use amount of resources associated with the queue pair, the use amount of resources can be maintained in an appropriate range.

Moreover, an upper limit number and a lower limit number are determined for the number of queue pairs, and the CPU core 311 increases the number of queue pairs when the number of queue pairs is smaller than the lower limit number and decreases the number of queue pairs when the number of queue pairs exceeds the upper limit number. In this way, it is possible to increase or decrease the number of queue pairs depending on a situation so that the number can be maintained in an appropriate range between the upper limit and the lower limit.

The CPU core 311 reads the policy management table 1600. The policy management table 1600 is queue pair increase/decrease policy management information indicating the policy used for controlling the number of queue pairs. The management terminal 240 displays the queue pair increase/decrease policy management information on a screen and updates the same according to an input operation. The server 200 may acquire the queue pair increase/decrease policy management information (the policy management table 1600) from the management terminal 240.

The CPU core 311 controls the number of queue pairs by referring to the queue pair increase/decrease policy management information as will be described later. In this way, it is possible to set and change the conditions for the queue pair increase/decrease control according to the user's desire.

The CPU core 311 reads the resource management table 1400, the queue pair management table 1500, and the process management table 1300. The CPU core 311 compares the lower limit in row 1640 in the policy management table 1600 that describes the policy related to the number of queue pairs processed by the storage program with the number of rows in the queue pair management table 1500 indicating the number of queue pairs to be processed and determines whether the lower limit in the row 1640 of the policy management table 1600 exceeds the number of rows of the queue pair management table 1500 (S4050).

When it is determined in step S4050 that the lower limit in the row 1640 of the policy management table 1600 exceeds the number of rows of the queue pair management table 1500 (S4050: YES) (that is, when the number of queue pairs is smaller than the lower limit on the policy), the CPU core 311 executes a queue pair increasing process (S4060). After that, the CPU core 311 executes a sleep process (S4090).

When it is determined in step S4050 that the lower limit in the row 1640 of the policy management table 1600 exceeds the number of rows of the queue pair management table 1500 (S4050: NO) (that is, the number of queue pairs does not fall below the lower limit on the policy), the CPU core 311 compares the number of rows (the number of queue pairs) of the queue pair management table 1500 with the number of rows (the number of activated processes of the storage program 700) of the process management table 1300 in step S4070. Furthermore, in step S4070, the CPU core 311 compares the upper limits in the rows 1640, 1650, and 1660 of the policy management table 1600 with the number of rows of the queue pair management table 1500. Furthermore, in step S4070, the CPU core 311 compares the upper limit in the row 1670 of the policy management table 1600 with the sum of the queue sizes calculated from the queue pair management table 1500.

When it is determined in step S4070 that the number of rows calculated from the queue pair management table 1500 exceeds the upper limit of the number of rows of the policy management table 1600 or the sum of the queue sizes calculated from the queue pair management table 1500 exceeds the upper limit of the memory volume used by the queue pair in the policy management table 1600 (S4070: YES) (that is, the number of queue pairs exceeds the upper limit of the policy), the CPU core 311 executes a queue pair decreasing process (S4080).

When the same queue is used and shared by a plurality of processes, there is a limitation that when a certain process is manipulating a queue, the other process cannot manipulate the queue. Such a conflict in queue manipulation may be a hindrance to achieve high throughput. In contrast, in the present embodiment, the CPU core 311 controls the number of queue pairs according to the number of processes that executes the storage process. Due to this, it is possible to suppress the number of queue pairs from increasing excessively and suppress an increase in the load on a queue checking process of checking the status of a queue. Moreover, it is possible to reduce a conflict in queue manipulation to suppress a decrease in the throughput.

When the number of rows calculated from the queue pair management table 1500 does not exceed the upper limit of the number of rows of the policy management table 1600 and the sum of the queue sizes calculated from the queue pair management table 1500 does not exceed the upper limit of the memory volume used by the queue pair in the policy management table 1600 (S4070: NO) (that is, the number of queue pairs does not exceed the upper limit of the policy), the CPU core 311 suspends the process (performs a sleep process) (S4090).

Even when the process of step S4060 or S4080 ends, the CPU core 311 performs the sleep process (S4090).

The time during which the CPU core 311 sleeps in step S4090 is 10 seconds, for example. However, the present embodiment is not limited thereto. As another example, the time may be one second or one minute. Alternatively, the sleep time may be variable.

Subsequently, after the sleep process of step S4090 ends, the CPU core 311 returns to step S4010 and repeatedly executes the processes of steps S4000 to S4090.

As in the present embodiment, when the storage process is implemented as a program operating on the OS 600 rather than as a part of the OS kernel 610, the portability of the storage program 700 is improved and the development efficiency is enhanced. Moreover, the storage program 700 operates independently from the OS 600 and communication from the storage program 700 to the OS kernel 610 increases. Therefore, in the present embodiment, in order to suppress loss of communication data and process the communication data efficiently, queues for retaining queuing are disposed in the direction from the storage program 700 to the OS kernel 610 as well as in the direction from the OS kernel 610 to the storage program. By using queues in both directions, it is possible to achieve high throughput performance.

Since the communication from the storage program 700 to the OS kernel 610 is a response to the communication for delivering a previously occurred request from the OS kernel 610 to the storage program 700, when the throughput of the communication in any one of the directions decreases, this causes a bottleneck and the throughput of the entire storage process decreases. However, in the present embodiment, since queues are used in both directions, it is possible to maintain high throughput in the entire storage process.

Moreover, the communication from the storage program 700 to the OS kernel 610 is a response to a communication for delivering a previously occurred request from the OS kernel 610 to the storage program 700. Therefore, in the present embodiment, the queue for retaining communication data transmitted from the OS kernel 610 to the storage program 700 is paired with the queue for retaining communication data transmitted from the storage program to the OS kernel 610, and the number of queue pairs is controlled in an interlocking manner to thereby make the control efficient.

Figure 19:
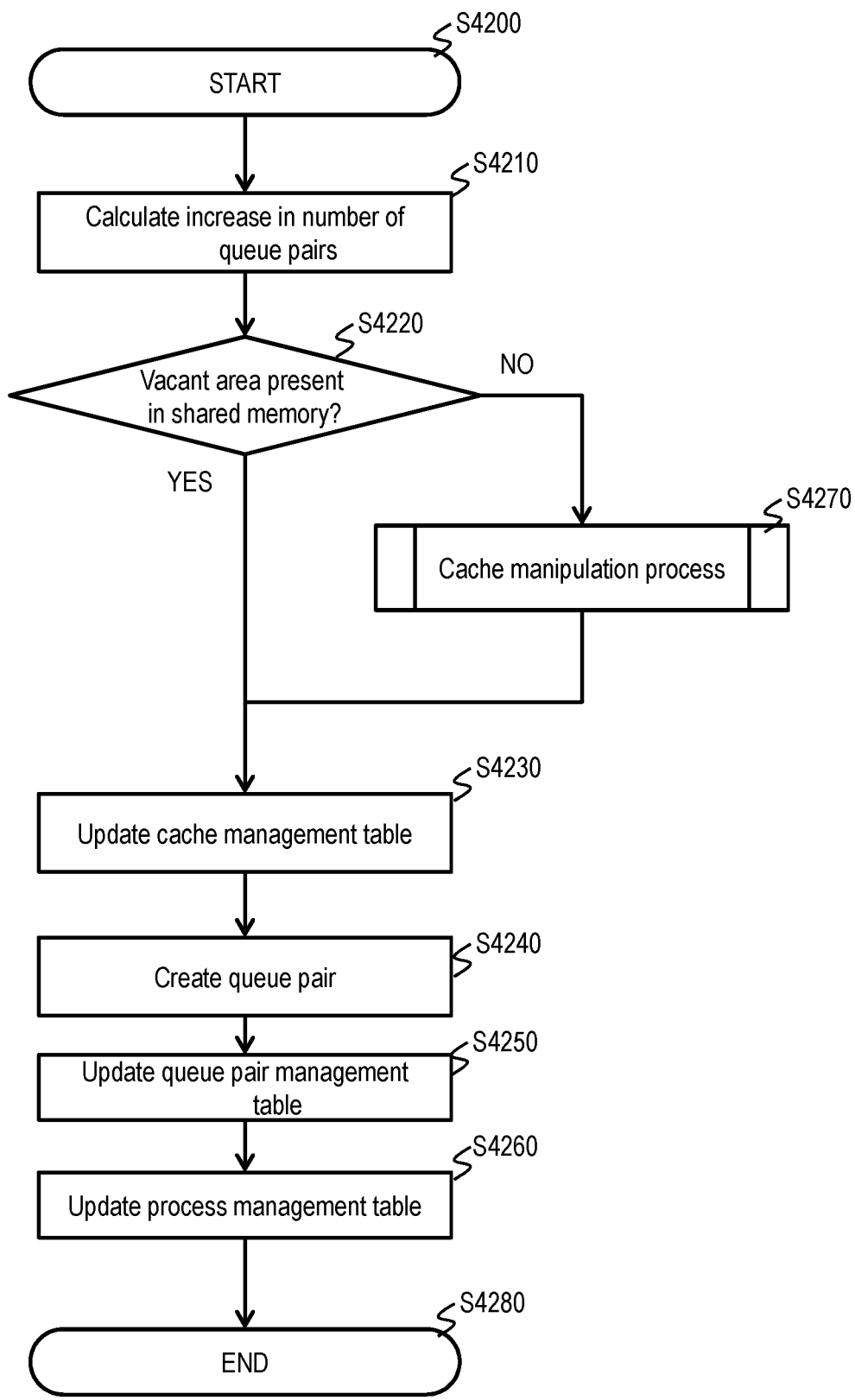
FIG. 19 is a flowchart of a queue pair increasing process.

FIG. 19 is a flowchart of the queue pair increasing process (S4060) of the queue pair monitoring program 1700. The CPU core 311 starts the process illustrated in FIG. 19 when called from the queue pair monitoring program 1700 (S4200).

First, the CPU core 311 calculates a smallest value among the upper limits in the respective rows of the policy management table 1600. In this case, as for row 1670 (memory volume used by queue pair), the upper limit is converted to the number of queue pairs by calculating the quotient of a division of the upper limit in row 1670 (memory volume used by queue pair) by 2 times the queue size in the starting row of the queue pair management table 1500.

In step S4210, the upper limit of the memory volume used by queue pairs converted to the number of queue pairs is compared with the upper limits in the other rows 1640, 1650, and 1660. Moreover, the CPU core 311 calculates a difference between the calculated smallest upper limit and the current number of queue pairs represented by the number of rows of the queue pair management table 1500 and determines the difference as the increase in the number of queue pairs.

Subsequently, the CPU core 311 compares the product between the increase in the number of queue pairs calculated in step S4210 and the queue size with a free space of the cache management table 900 and determines whether the free space exceeds a total queue size corresponding to the increase in the number of queue pairs (S4220).

When it is determined in step S4220 that the free space exceeds a total queue size corresponding to the increase in the number of queue pairs (S4220: YES), the CPU core 311 updates the free space in the cache management table 900 with a value obtained by subtracting the increase in the number of queue pairs (S4230). When the free space is smaller than the total queue size corresponding to the increase in the number of queue pairs (S4220: NO), the CPU core 311 performs a cache manipulation process (S4270) and increases the free space of the cache 800.

Subsequently, the CPU core 311 creates a number of queue pairs corresponding to the increase in the number of queue pairs calculated in step S4210 (S4240).

Subsequently, the CPU core 311 updates the queue pair management table 1500 with the information on the added queue pairs (S4250).

Subsequently, the CPU core 311 adds the IDs of the added queue pairs to the process management table 1300 (S4260). The CPU core 311 ends the queue pair increasing process when the process of step S4260 ends.

As described above, when increasing the number of queue pairs, the CPU core 311 converts the upper limit amount of the resource use amount so as to enable comparison with the upper limit number of the number of queue pairs. Furthermore, the CPU core 311 calculates the smallest upper limit number among the upper limit number converted from the upper limit amount and the upper limit number of the number of queue pairs. Furthermore, the CPU core 311 determines the difference between the calculated upper limit number and the current number of queue pairs as an increase in the number of queue pairs. In this way, since the upper limit amount of the resource use amount is converted to an upper limit number represented by a number so as to be capable of being compared with the upper limit number, it is possible to increase the number of queue pairs to an appropriate number while maintaining the respective values to be within a limited range by relatively simple calculation based on numbers.

Figure 20:
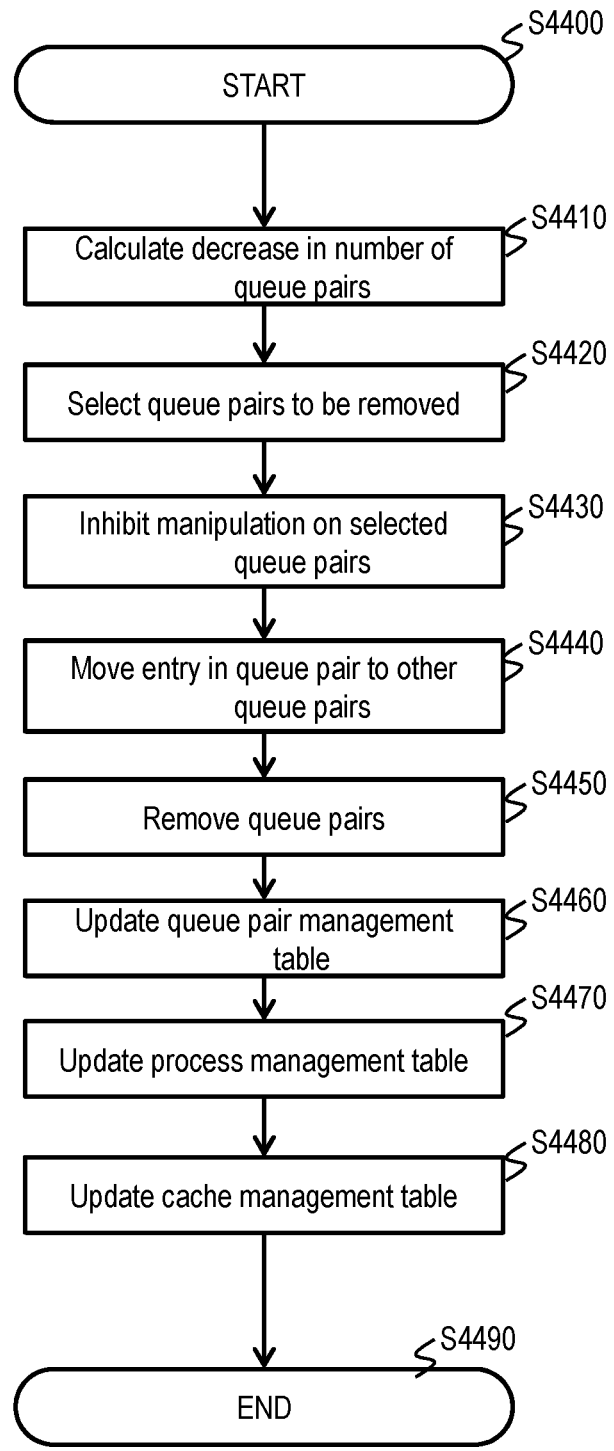
FIG. 20 is a flowchart of a queue pair decreasing process.

FIG. 20 is a flowchart of the queue pair decreasing process (S4080) of the queue pair monitoring program 1700. The CPU core 311 starts the process of FIG. 20 when called from the queue pair monitoring program 1700 (S4400).

First, the CPU core 311 calculates a smallest value among the upper limits in the respective rows of the policy management table 1600 (S4410). In this case, as for row 1670 (memory volume used by queue pair), the upper limit is converted to the number of queue pairs by calculating the quotient of a division of the upper limit in row 1670

(memory volume used by queue pair) by 2 times the queue size in the starting row of the queue pair management table 1500. In step S4410, the upper limit of the memory volume used by queue pairs converted to the number of queue pairs is compared with the upper limits in the other rows 1640, 1650, and 1660. Moreover, the CPU core 311 determines a difference between the calculated smallest value and the current number of queue pairs as the decrease in the number of queue pairs.

Subsequently, the CPU core 311 selects a number of queue pairs corresponding to the decrease in the number of queue pairs sequentially from the side located closest to the area of the cache 800 by referring to the queue pair management table 1500 and the cache management table 900.

In the present embodiment, when there is a plurality of shared memories 400, the CPU core 311, if possible, disposes queue pairs in the same shared memory 400 as the shared memory in which the cache 800 is disposed when creating queue pairs. In step S4420, the CPU core 311 selects queue pairs disposed in the same shared memory 400 as the shared memory in which the cache 800 is disposed.

Subsequently, the CPU core 311 updates the setting of the manipulatability 1545 in the queue pair management table 1500 with respect to the queue pairs selected in step S4420 and inhibits manipulation of queue pairs (S4430).

Subsequently, the CPU core 311 moves the entries present in the selected queue pairs to the other queue pairs (S4440). When all selected queue pairs are empty, the CPU core 311 removes the selected queue pairs (S4450). Subsequently, the CPU core 311 removes the information on the removed queue pair from the queue pair management table 1500 (S4460). Subsequently, the CPU core 311 removes the ID of the removed queue pair from the queue pair ID 1320 of the process management table 1300 (S4470).

Finally, the CPU core 311 updates the information on the free space in the cache management table 900 to end the process (S4480).

As described above, when the cache 800 is disposed on the shared memory 400, the CPU core 311 removes a queue pair closest to the area of the cache 800 when removing queue pairs. In this way, since a queue pair located closest to the area of the cache 800 is removed when removing queue pairs, it is possible to create a free area formed by the removal of queue pairs at a position at which the free area can be efficiently used by the cache 800.

Moreover, when decreasing the number of queue pairs, the CPU core 311 converts the upper limit amount of the resource use amount so as to enable comparison with the upper limit number of the number of queue pairs. Furthermore, the CPU core 311 calculates the smallest upper limit number among the upper limit number converted from the upper limit amount and the upper limit number of the number of queue pairs. Furthermore, the CPU core 311 determines the difference between the calculated upper limit number and the current number of queue pairs as a decrease in the number of queue pairs. Since the upper limit amount of the resource use amount is converted to a number so as to be compared with the upper limit number, it is possible to decrease the number of queue pairs to an appropriate number while maintaining the respective values to be within a limited range by relatively simple calculation based on numbers.

Figure 21:
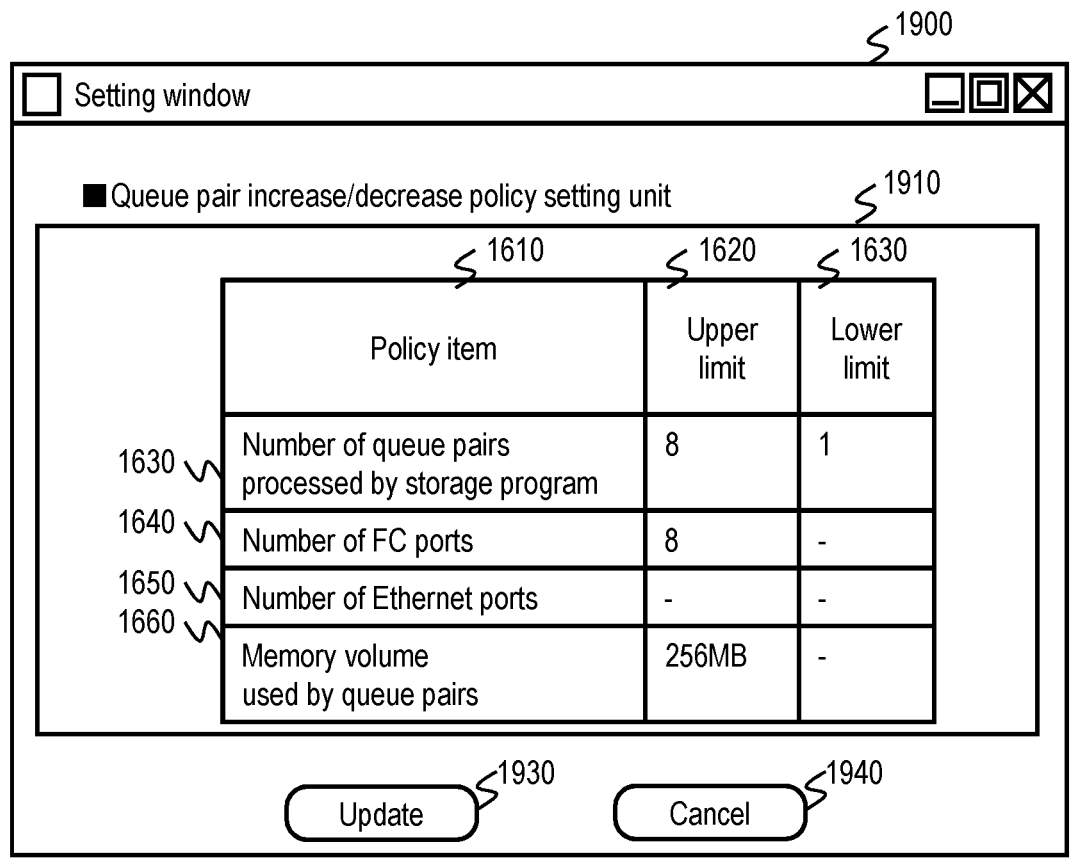
FIG. 21 is a diagram illustrating an example of a GUI that manages system settings.

FIG. 21 is a diagram illustrating an example of a GUI (Graphical User Interface) for managing system settings. A management program executed by a CPU included in the management terminal 240 provides a GUI 1900 for making system settings to a system administrator. The system administrator inputs instructions on the system settings to the server 200 using the GUI 1900.

The GUI 1900 is a GUI for setting a queue pair increase/decrease policy and includes a queue pair increase/decrease policy setting unit 1910, an update button 1930, and a cancel button 1940.

The queue pair increase/decrease policy setting unit 1910 is a unit for displaying the information on the policy management table 1600 stored in the server 200 or for allowing the system administrator to set the information on the policy management table 1600 to be stored in the server 200. As for the number of queue pairs processed by the storage program, the number of FC ports, the number of Ethernet ports, and the memory volume used by queue pairs illustrated in the policy item 1610, current values set for the upper limit 1620 and the lower limit 1630 are displayed and the values can be edited. The policy item 1610 and the upper limit 1620 and the lower limit 1630 thereof have the same meanings as those of the policy management table 1600.

When the system administrator edits the queue pair increase/decrease policy setting unit 1910 and presses the update button 1930, the update content is notified from the management terminal 240 to the server 200. The server 200 having received the update content updates the content of the policy management table 1600 according to the received update content.

When the system administrator presses the cancel button 1940, the management terminal 240 ends the system setting and closes the GUI 1900.

While the embodiment of the present invention has been described, the embodiment is an example for describing the present invention and it should be noted that the scope of the present invention is not limited to the above-described configuration. The present invention can be implemented in various other embodiments.

REFERENCE SIGNS LIST

10 Computer system
200 Server
210 Host
220 Network
240 Management terminal
310 CPU
311 CPU core
320 Memory
331 HBA
332 NIC
340 Logical volume
351 SSD
352 HDD
360 Disk device
400 Shared memory
410 Initiator-Target queue (ITQ)
420 Target-Initiator queue (TIQ)
500 Communication driver program
600 OS
610 OS kernel
620 I/O request reception program
640 I/O response transmission program
700 Storage program
800 Cache
900 Cache management table
1000 Volume management table
1300 Process management table
1400 Resource management table
1500 Queue pair management table 1600 Policy management table
1700 Queue pair monitoring program

The invention claimed is:

1. A computer system comprising:
a processor configured to execute an operating system and a storage program that operates on the operating system to provide a logical volume to a host; and
a memory that includes a queue for retaining communication data between the operating system and the storage program, and volume management information including information on a storage function to be applied to the logical volume provided by the storage program, and a cache which is configured to temporarily store data of the logical volume, wherein
the storage program is configured to be able to apply the storage function to the logical volume,
the operating system is configured to:
upon receiving an I/O request for the logical volume from the host, determine whether or not it is necessary for the storage program to process the I/O request on the basis of the information on the storage function to be applied to the logical volume which is a target of the I/O request, by referring to the volume management information, and
when it is determined that it is necessary for the storage program to process I/O request, communicate with the storage program via the queue,
the storage program is configured to execute a process for the I/O request based on communication with the operating system via the queue, and
the operating system is further configured to:
when the storage function is not applied on the logical volume and target data of the I/O request is available and exists on the cache, determine that processing of the I/O request by the storage program is not necessary, and
when the storage function is applied on the logical volume or when the target data is not available on the cache, determine that processing of the I/O request by the storage program is necessary, and
the operating system is configured to:
when it is determined that that processing of the I/O request by the storage program is not necessary, output a response to the I/O request to the host on the basis of the target data present on the cache.

2. The computer system according to claim 1, wherein
the memory includes cache management information that manages data on the cache, and
when the I/O request is a read request and there is no write data for updating the target data on the cache, the operating system determines the target data of the I/O request is available and exists on the cache.

3. The computer system according to claim 2, wherein
the operating system executed by the processor is configured to communicate with the storage program via the queue when a write request for an address range of the logical volume which is a target of the read request is present in the queue,
the storage program executed by the processor is configured to execute a process for the read request based on communication with the operating system via the queue, and
the operating system is configured to output the response to the read request when a write request for the address range of the logical volume which is the target of the read request is not present in the queue.

4. The computer system according to claim 3, wherein
the processor is configured to use the queue as a pair which includes a first queue that retains communication data transmitted from the operating system to the storage program and a second queue that retains communication data transmitted from the storage program to the operating system, and is configured to control the number of queue pairs which are pairs of the first and second queues.

5. The computer system according to claim 4, wherein
the processor is configured to control the number of queue pairs according to the number of processes executed by the storage program.

6. The computer system according to claim 4, wherein
the processor is configured to control the number of queue pairs on the basis of a use amount of resources associated with the queue pair.

7. The computer system according to claim 4, wherein
the cache and the queue pairs are disposed on an area of the memory shared by the storage program and the operating system, and
the processor is configured to remove a queue pair located closest to the area of the cache when removing the queue pairs.

8. The computer system according to claim 4, wherein
an upper limit number and a lower limit number are set for the number of queue pairs, and
processor is configured to increase the number of queue pairs when the number of queue pairs is smaller than the lower limit number, and decrease the number of queue pairs when the number of queue pairs exceeds the upper limit number.

9. The computer system according to claim 6, wherein
an upper limit amount is set for the use amount of resources, and
the processor is configured to, when increasing the number of queue pairs, convert the upper limit amount of the use amount of resources so as to enable comparison with an upper limit number of the number of queue pairs, calculate a smallest upper limit number among the upper limit number converted from the upper limit amount and the upper limit number of the number of queue pairs, and determine a difference between the calculated upper limit number and a current number of queue pairs as an increase in number of queue pairs.

10. The computer system according to claim 6, wherein
an upper limit amount is set for the use amount of resources, and
the processor is configured to, when decreasing the number of queue pairs, convert the upper limit amount of the use amount of resources so as to enable comparison with an upper limit number of the number of queue pairs, calculate a smallest upper limit number among the upper limit number converted from the upper limit amount and the upper limit number of the number of queue pairs, and determine a difference between the calculated upper limit number and a current number of queue pairs as a decrease in number of queue pairs.

11. The computer system according to claim 4, wherein
the processor is configured to: acquire queue pair increase/decrease policy management information indicating a policy to be used for controlling the number of queue pairs from a management computer that is configured to display the queue pair increase/decrease policy management information on a screen and update the queue pair increase/decrease policy management information according to an input operation; and control the number of queue pairs by referring to the queue pair increase/decrease policy management information.

12. A computer comprising:
a processor configured to execute an operating system and a storage program that operates on the operating system to provide a logical volume to a host; and
a memory that includes a queue for retaining communication data between the operating system and the storage program, and volume management information including information on a storage function to be applied to the logical volume provided by the storage program, and a cache which is configured to temporarily store data of the logical volume, wherein
the storage program is configured to be able to apply the storage function to the logical volume,
the operating system is configured to:
upon receiving an I/O request for the logical volume from the host, determine whether or not it is necessary for the storage program to process the I/O request on the basis of the information on the storage function to be applied to the logical volume which is a target of the I/O request, by referring to the volume management information, and
when it is determined that it is necessary for the storage program to process the I/O request, communicate with the storage program via the queue,
the storage program is configured to execute a process for the I/O request based on communication with the operating system via the queue, and
when the storage function is not applied on the logical volume and target data of the I/O request is available and exists on the cache, the operating system is configured to determine that processing of the I/O request by the storage program is not necessary, and, when the storage function is applied on the logical volume or when there is no target data of the I/O request available on the cache, the operating system is configured to determine that processing of the I/O request by the storage program is necessary, and
the operating system is configured to:
when it is determined that it is not necessary for the storage program to process the I/O request, output a response to the I/O request to the host on the basis of the target data present on the cache.

13. The computer according to claim 12, wherein the host is a host program executed by the processor.

14. A computer system comprising:
a processor configured to execute an operating system and a storage program that operates on the operating system to provide a logical volume to a host; and
a memory that includes a queue pair including a first queue that retains communication data transmitted from the operating system to the storage program and a second queue that retains communication data transmitted from the storage program to the operating system, and volume management information including information on a storage function to be applied to the logical volume provided by the storage program;
wherein the operating system is configured to, upon receiving an I/O request for the logical volume from the host, determine whether it is necessary for the storage program to process the I/O request on the basis of the information on the storage function to be applied to the logical volume which is a target of the I/O request, by referring to the volume management information, and is configured to communicate with the storage program via the first queue when it is determined that the process is necessary;
wherein the storage program is configured to execute a process based on the I/O request;
wherein the memory includes a cache that temporarily stores data of the logical volume, and cache management information that manages data on the cache;
wherein the operating system executed by the processor is configured to communicate with the storage program via the first queue upon receiving a write request for the logical volume from the host;
wherein the storage program executed by the processor is configured to execute a process based on the write request;
wherein the operating system is configured to, when the I/O request is a read request for the logical volume from the host and when it is determined that data corresponding to the read request is present on the cache by referring to the cache management information, output a response to the read request to the host on the basis of the data present on the cache;
wherein the operating system executed by the processor is configured to communicate with the storage program via the first queue when a write request for an address range of the logical volume which is a target of the read request is present in the first queue;
wherein the storage program executed by the processor is configured to execute a process based on the read request;
wherein the operating system is configured to output the response to the read request when the write request for the address range of the logical volume which is the target of the read request is not present in the queue; and
wherein the processor is configured to control a number of queue pairs which are pairs of the first and second queues.

15. The computer system according to claim 14, wherein the processor is configured to control the number of queue pairs according to a number of processes executed by the storage program.

16. The computer system according to claim 14, wherein the processor is configured to control the number of queue pairs on the basis of a use amount of resources associated with the queue pair.

17. The computer system according to claim 16, wherein an upper limit amount is set for the use amount of resources; and
wherein the processor is configured to, when increasing the number of queue pairs, convert the upper limit amount of the use amount of resources so as to enable comparison with an upper limit number of the number of queue pairs, calculate a smallest upper limit number among the upper limit number converted from the upper limit amount and the upper limit number of the number of queue pairs, and determine a difference between the calculated upper limit number and a current number of queue pairs as an increase in number of queue pairs; and
wherein the processor is configured to, when decreasing the number of queue pairs, convert the upper limit amount of the use amount of resources so as to enable comparison with an upper limit number of the number of queue pairs, calculate a smallest upper limit number among the upper limit number converted from the upper limit amount and the upper limit number of the number of queue pairs, and determine a difference between the calculated upper limit number and a current number of queue pairs as a decrease in number of queue pairs.

18. The computer system according to claim 14,
wherein the cache and the queue pairs are disposed on an area of the memory shared by the storage program and the operating system; and
wherein the processor is configured to remove a queue pair located closest to the area of the cache when removing the queue pairs.

19. The computer system according to claim 14,
wherein an upper limit number and a lower limit number are set for the number of queue pairs; and
wherein the processor is configured to increase the number of queue pairs when the number of queue pairs is smaller than the lower limit number, and decrease the number of queue pairs when the number of queue pairs exceeds the upper limit number.

20. The computer system according to claim 14,
wherein the processor is configured to: acquire queue pair increase/decrease policy management information indicating a policy to be used for controlling the number of queue pairs from a management computer that is configured to display the queue pair increase/decrease policy management information on a screen and update the queue pair increase/decrease policy management information according to an input operation; and control the number of queue pairs by referring to the queue pair increase/decrease policy management information.

* * * * *